US011220354B2

(12) United States Patent
Martino-Gonzalez et al.

(10) Patent No.: US 11,220,354 B2
(45) Date of Patent: Jan. 11, 2022

(54) COMPOSITE FUSELAGE ASSEMBLY AND METHODS TO FORM THE ASSEMBLY

(71) Applicant: AIRBUS OPERATIONS S.L., Madrid (ES)

(72) Inventors: Esteban Martino-Gonzalez, Aranjuez (ES); Alberto Arana Hidalgo, Madrid (ES); Melania Sanchez Perez, Madrid (ES); Carlos Garcia Nieto, Pinto (ES); Jesus Javier Vazquez Castro, Getafe (ES); Edouard Menard, Madrid (ES); Fernando Iniesta Lozano, Madrid (ES); Maria Almudena Canas Rios, Madrid (ES)

(73) Assignee: Airbus Operations S.L.U., Madrid (ES)

( * ) Notice: Subject to any disclaimer, the term of this patent is extended or adjusted under 35 U.S.C. 154(b) by 41 days.

(21) Appl. No.: 16/515,330

(22) Filed: Jul. 18, 2019

(65) Prior Publication Data
US 2020/0023934 A1    Jan. 23, 2020

(30) Foreign Application Priority Data

Jul. 23, 2018  (EP) ..................................... 18382551

(51) Int. Cl.
| B64F 5/10 | (2017.01) |
| B64C 1/26 | (2006.01) |
| B64C 3/26 | (2006.01) |
| B64C 5/02 | (2006.01) |
| B64C 1/00 | (2006.01) |

(52) U.S. Cl.
CPC ................ *B64F 5/10* (2017.01); *B64C 1/26* (2013.01); *B64C 3/26* (2013.01); *B64C 5/02* (2013.01); *B64C 2001/0072* (2013.01)

(58) Field of Classification Search
CPC ..... B64F 5/10; B64C 5/02; B64C 5/06; B64C 1/26; B64C 3/26; B64C 2001/0072; B29C 70/30; B29D 99/001
See application file for complete search history.

(56) References Cited

U.S. PATENT DOCUMENTS

| 8,104,714 B2 | 1/2012 | Brown et al. |
| 2015/0183506 A1 | 7/2015 | García Martín et al. |
| (Continued) | | |

FOREIGN PATENT DOCUMENTS

EP   3 584 053   12/2019

OTHER PUBLICATIONS

Search Report for EP18382551.2, dated Jan. 28, 2019, 5 pages.

*Primary Examiner* — Moshe Wilensky
(74) *Attorney, Agent, or Firm* — Nixon & Vanderhye P.C.

(57) ABSTRACT

A method for manufacturing a composite rear section assembly having a continuous skin solution including obtaining a vertical tail plane tooling that has intermediate tooling for tooling intermediate preforms of a vertical tail plane (800), obtaining a fuselage barrel tooling (420*a*), (420*b*), (420*c*) and (420*d*) the fuselage barrel tooling having a cut-out (503*a*), (503*b*), (503*c*) and longitudinal cavities (501*a*), (501*b*), (501*c*) and (501*d*), attaching the vertical tail plane tooling to the fuselage barrel tooling by the cut-out of the fuselage barrel tooling, performing a composite skin lay-up (801) over the fuselage barrel tooling and the vertical tail plane tooling to obtain a continuous skin, curing the composite skin lay-up, the vertical tail plane tooling and the fuselage barrel tooling and demolding the tools to obtain the composite assembly with a continuous skin (1300), (1600).

17 Claims, 23 Drawing Sheets

(56) References Cited

U.S. PATENT DOCUMENTS

2016/0297510 A1 10/2016 Folch Cortes et al.
2017/0066518 A1 3/2017 Gallant et al.
2018/0170513 A1 6/2018 Martino Gonzáles et al.

COMPOSITE FUSELAGE ASSEMBLY AND METHODS TO FORM THE ASSEMBLY

RELATED APPLICATION

This application claims priority to European Patent Application 18382551-2, filed Jul. 23, 2018, the entirety of which is incorporated by reference.

FIELD OF THE INVENTION

The present invention refers to a manufacturing process for a composite assembly that comprises a fuselage rear section and the vertical tail plane (VTP) of an aircraft and devices for the manufacturing of the composite assembly.

BACKGROUND OF THE INVENTION

Conventionally, to build an aircraft fuselage, a series of frames in the shape of the fuselage cross sections are held in position on a rigid fixture. These frames are then joined with the fuselage skin panels that includes lightweight longitudinal elements called stringers that increase the buckling resistance of the skin. The stringers are attached to the skin by means of riveting, by cured resin or by bonding with special adhesives. The junction of the skin panels and the frames is performed by means of angular interface parts called shear ties that joint the frame web and the fuselage skin, to conform the complete fuselage. In some cases, these angular parts can be part of the frame as an integrated flange.

The vertical tail plane also known as empennage is conventionally formed by a structural primary torsion box, a leading, a trailing edge a tip fairing and a movable surface. The primary torsion box is formed by a skin, two or more spars and internal ribs. If the number of spars is sufficient, the total number of the ribs could be reduced or the ribs may be unnecessary.

In known aircrafts the junction between the vertical tail plane and the fuselage rear section is performed by means of interface fittings to form the tail cone section. These fittings are in charge of transferring the continuum loads distribution on the skins of the torsion box of the empennage, into punctual loads that are transferred to the frames of the fuselage. Frames then distribute the load to the fuselage skin.

The loads at those interface fittings are very high because they concentrate on punctual areas of the structure, leading to significant reinforcement and penalty weight for the fitting and surrounding elements. Additionally, the fitting need to be covered by aerodynamic fairing that produces significant penalty of drag and on assembly lead time. Examples of interface fittings and associated aerodynamic fairing are showed on FIGS. 1 to 3.

Therefore, a new assembly of the tail cone section and the vertical tail plane with a continuous skin that solves the aforementioned drawbacks and methods for its manufacturing is desired.

SUMMARY OF THE INVENTION

With the manufacturing method according to the present disclosure is possible to obtain a composite assembly of multi-spar box for a rear section of an aircraft having a continuous skin solution. Several parts of the fuselage can be assembled by joint means in order to obtain the final assembly. In some examples, the composite assembly of the multi-spar box includes a multi-spar vertical tail plane VTP or empennage and the tail cone section as part of the rear section of the aircraft.

With the composite assembly obtained with the manufacturing method according to the present invention is possible to integrate the tail cone section with the vertical tail plane of an aircraft with a continuous skin solution, creating a process to manufacture in one shot the tail cone and the vertical tail plane. A lot of processes are possible, but because of the complexity of the structure a manufacture process as proposed is required.

Hence, the proposed invention may be embodied as a manufacturing process for this continuous skin concept for the fuselage junction of the vertical tail plane and the tail cone section. A multi-spar concept is used for a full integrated multi-spar box with a continuous skin. Then it is joined to inner structural components of the fuselage rear section.

In one aspect, the present invention refers to devices for the manufacturing of parts of the composite assembly. Those devices relate to tools for the rear section of the aircraft as a vertical tail plane tool for a vertical tail plane of the aircraft or a fuselage barrel tool for a fuselage barrel of the aircraft. In some examples, the vertical tail plane tool may comprise a tool for tooling internal spars or preforms of the vertical tail plane. In other examples, the vertical tail plane tool may additionally comprise a tool for tooling a front spar and a tool for tooling a rear spar of the vertical tail plane.

In another aspect, the present invention refers to a manufacturing process for a composite fuselage assembly comprising a multispar vertical tail plane and a tail cone section, the fuselage assembly having a continuous skin solution.

The process comprises attaching collapsible spar tools to obtain a vertical tail plane tooling. The collapsible spar tools relate to an intermediate tooling for intermediate preforms of the multispar box and additionally to a front spar tooling, a rear spar tooling for a front spar and a rear spar, respectively. A fuselage barrel having external longitudinal cavities on the external surface of the barrel to allocate composite stringer laminates is obtained with a fuselage barrel tooling. A composite lay-up of the skin laminate is performed onto the assembly of the fuselage and the vertical tail plane assembly.

Furthermore, after co-curing the assembly, a demoulding process is carried out for the rear spar tooling, the front spar tooling and the intermediate tooling and the fuselage barrel tooling to obtain the composite fuselage assembly. In some examples, the intermediate tooling is demoulded before the fuselage barrel tooling. In some other examples, the fuselage barrel tooling is demoulded before the intermediate tooling.

An advantage of this invention to ease the assembly process and the management of tolerances, thereby reducing the production lead time and recurring cost, because is a one shot big component that comprises both the fuselage barrel and the vertical tail plane in one shot instead of producing the final part by joining many single parts with hundreds of fasteners.

Other advantages in manufacturing a composite assembly of the empennage with a continuous skin include:

The loads are not transferred by means of interface fittings to discrete points as previously mentioned. In contrast, a transition surface between fuselage skin and the vertical tail plane skin allows a smooth loads transmission between those surfaces, so that vertical tail plane skin loads can pass directly to the fuselage skin on a continuous manner without the need of interface fittings and without passing though the fuselage frames. As consequence there is an important weight reduction due to the removal of the heavy fittings and their aerodynamic fairings. Also the frames are much lighter because they don't transmit high loads from the fitting and because their dimension constrains, due to the integration of interface fittings, are also removed, so that the frame height and thickness and associated weight can be significantly reduced.

Vertical tail plane fittings and its aerodynamic fairings can be produce mechanical issue for fatigue, vibro-acoustics and debris impact, in the case the engine is placed on the rear part of the aircraft. On the proposed solution those parts and associated issues are removed, so it provides a lightweight structure with higher damage tolerance strength to fatigue, vibro-acoustics and impact, with significant advantages for such aircraft configuration.

Finally, there is also an important aerodynamic drag reduction due to the removal of the fitting fairings, and providing an integrated smooth aerodynamic transition of skin surface.

SUMMARY OF THE DRAWINGS

For a better understanding the above explanation and for the sole purpose of providing an example, some non-limiting drawings are included that schematically depict a practical embodiment.

DETAILED DESCRIPTION OF THE INVENTION

Figure 1A:
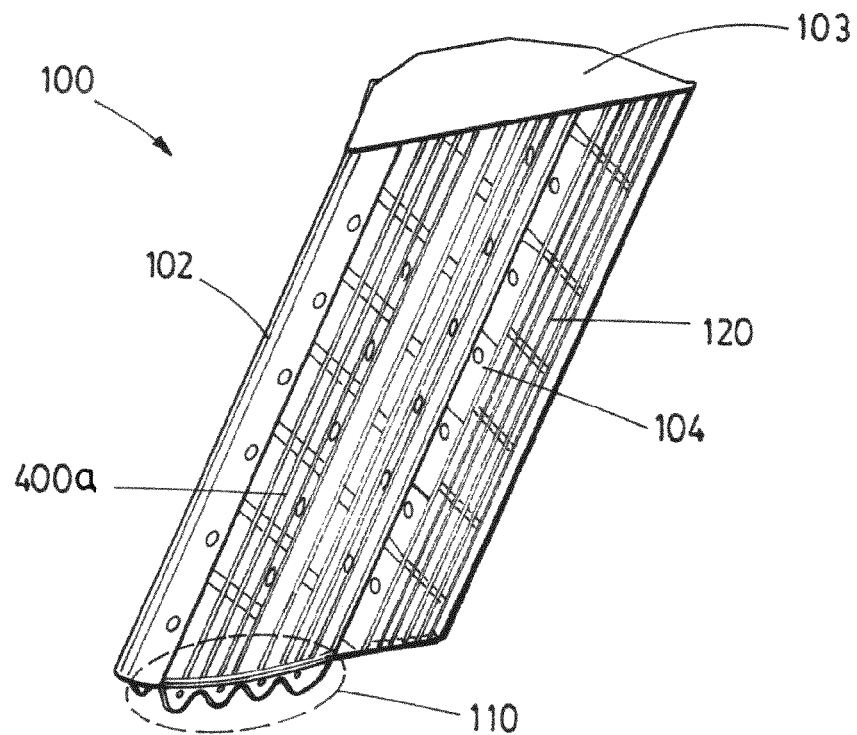
FIGS. 1A and 1B show conventional vertical tail plane structure and its interface fittings comprising longitudinal load fittings and transversal load fittings of a conventional vertical tail plane of an aircraft.
Figure 1B:
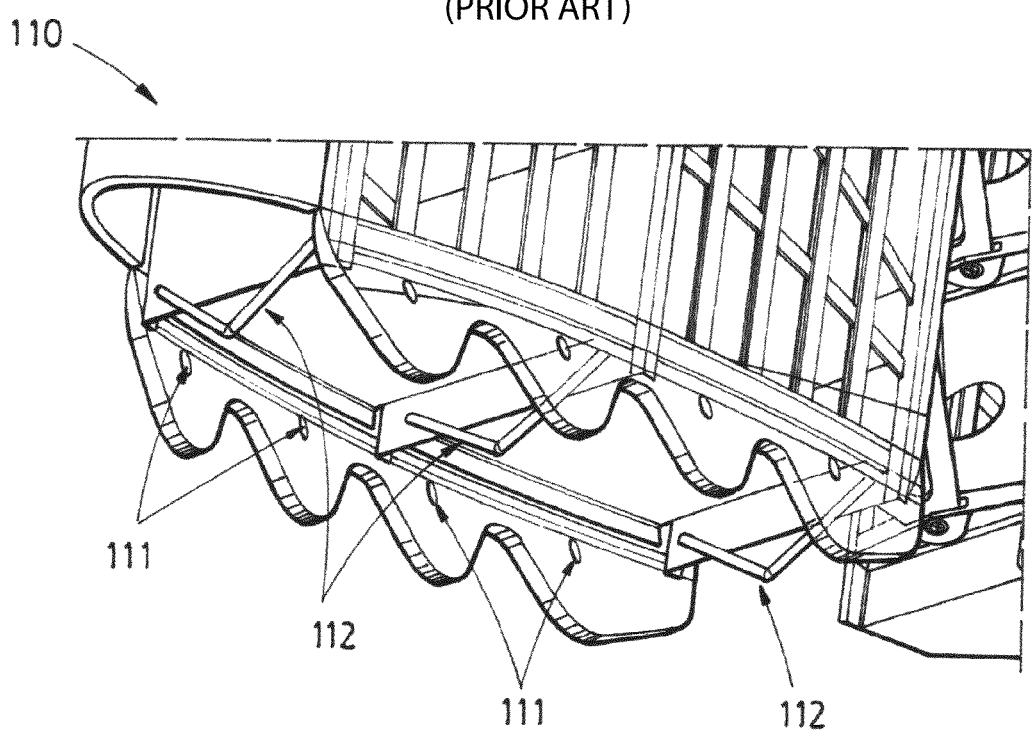

FIG. 1A shows a vertical tail plane (100). The vertical tail plane comprises a multi-spar box (400a), a leading edge (102), a trailing edge (104), a movable called rudder (120), a tip fairing (103) and interface fittings (110). FIG. 1B shows the interface fittings divided in longitudinal load fittings (111) and in transversal load fittings (112) of a conventional vertical tail plane of an aircraft.

Figure 2:
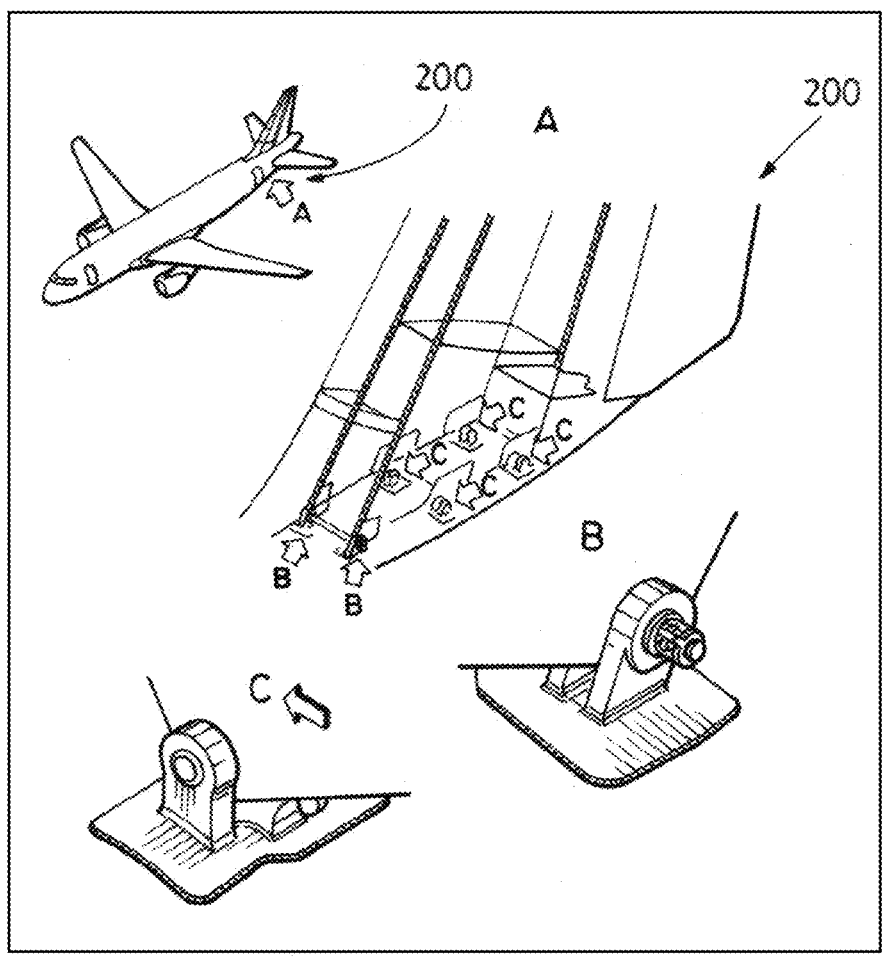
FIG. 2 shows another example of conventional vertical tail plane lugs and lateral attachments.

FIG. 2 shows another example of conventional vertical tail plane lugs and lateral attachments 200.

Figure 3:
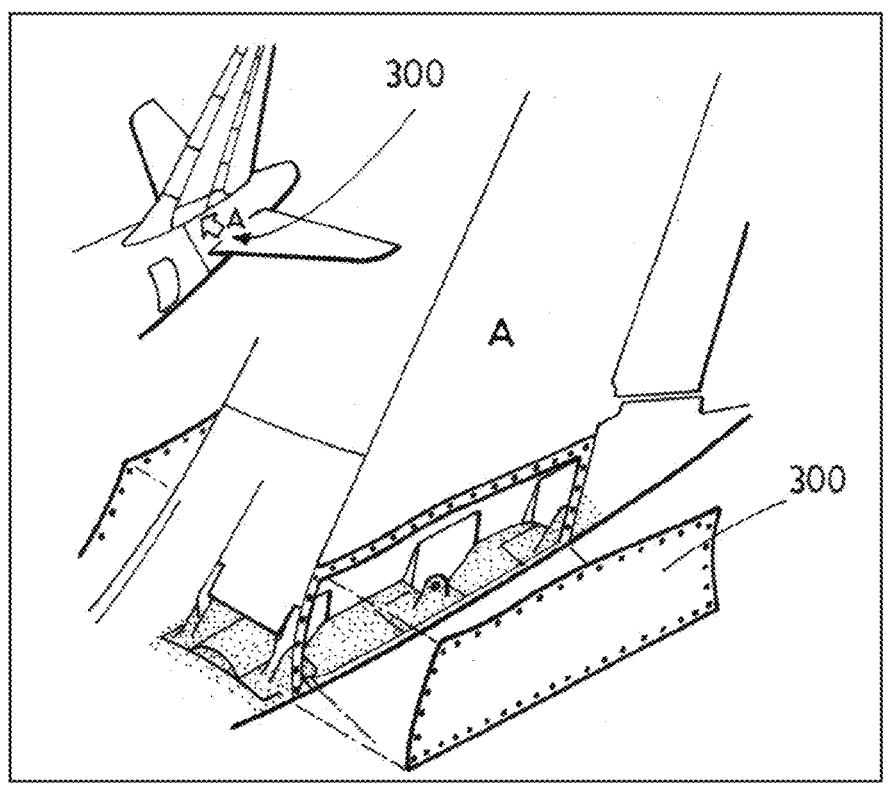
FIG. 3 shows conventional fairings to cover interface fittings as shown in FIGS. 1A and 1B.

FIG. 3 shows conventional fairings (300) to cover interface fittings as the ones shown in FIGS. 1A, 1B and 2.

Figure 4A:
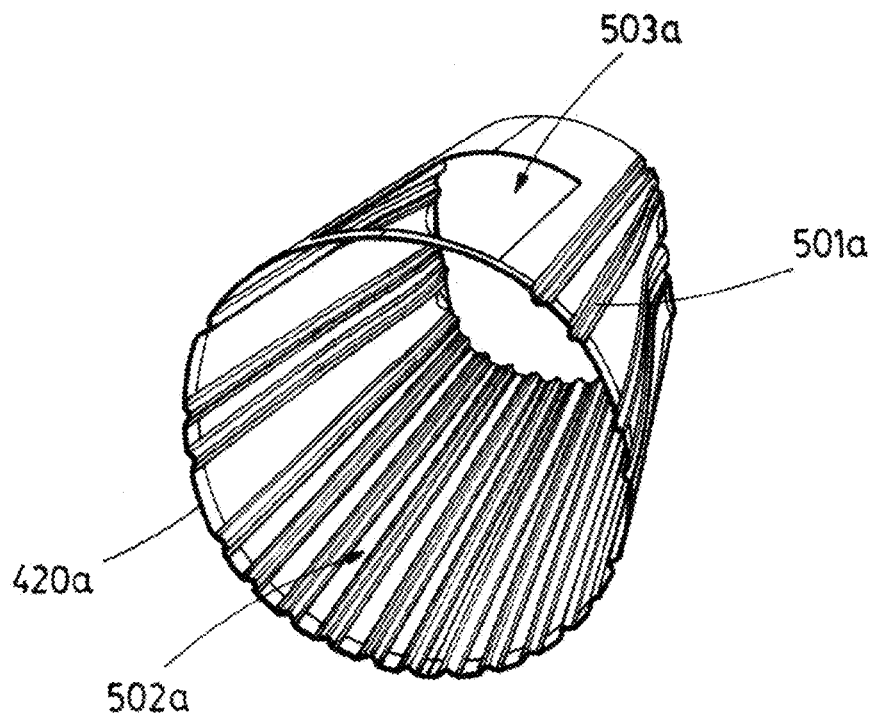
FIG. 4A shows a first tool to obtain the fuselage barrel according to the present disclosure.

FIG. 4A shows a first fuselage barrel tooling (420a) used to obtain the fuselage barrel as part of the fuselage and vertical tail plane assembly according to the present disclosure. Wherein the fuselage barrel tooling (420a) is an assembly of molds (tools) that forms a mold surface that will form an internal surface of the rear section of the fuselage of the empennage of an aircraft. The fuselage barrel tooling (420a) is formed by a thin metallic layer that copies the internal surface of the fuselage and stringers. However, thickness of this tool could be much higher depending of the pressure and temperature that could be required for the curing process. The fuselage barrel tooling (420a) comprises external longitudinal cavities (501a) on the external surface of the barrel to allocate composite stringer laminates, that can be omega shape (as showed on the picture) or with a shape of T, L or other section that is driven by the shape of the these cavities. The fuselage barrel tooling (420a) also comprises an upper cut-out (503a) located on its upper part at the interface zone with the vertical tail plane, that allows the installation of the vertical tail plane tooling assembly. The fuselage barrel tooling (420a) also comprises an internal longitudinal cavity (502a) to communicate with the upper cut-out (503a) that allow the demoulding of the vertical tail plane tooling. The fuselage barrel tooling (420a) is demoulding after the demoulding of a vertical tail plane intermediate tooling not shown in the figure.

Figure 4B:
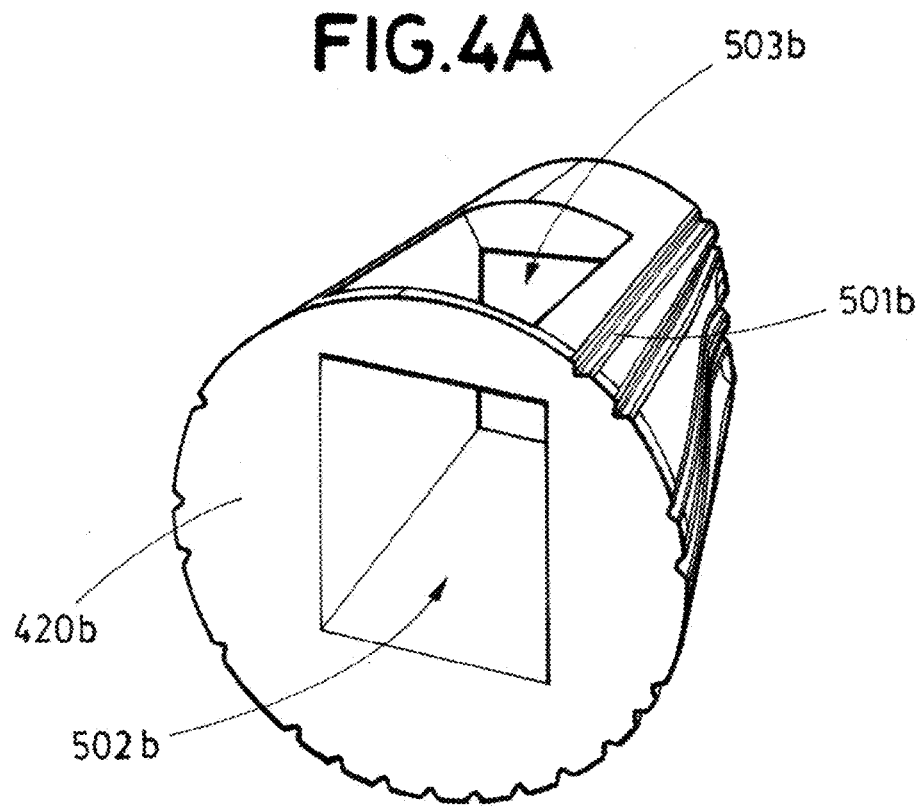
FIG. 4B shows a second tool to obtain the fuselage barrel according to the present disclosure.

FIG. 4B shows an alternative embodiment for the fuselage barrel tooling (420b) used to obtain the fuselage barrel as part of the fuselage and vertical tail plane assembly. The fuselage barrel tooling (420b) is made out of a massive metallic part instead of a thin metallic skin, that could be more appropriate for high pressures present for example of an autoclave curing process. The external surface of the tooling also copies the internal surface of the fuselage and stringers, and also comprises external longitudinal cavities (501b) on the external surface of the barrel to allocate composite stringer laminates, an upper cut-out (503b) located on the upper part, that allows the installation of the vertical tail plane tooling, and an internal longitudinal cavity (502b) to communicate with the upper cut-out (503a) that allow the demoulding of the vertical tail plane tooling. These fuselage barrel tools (420a) and (420b) can be made of metallic materials as steel, aluminium but also from other material as reinforced plastics, etc. The fuselage barrel tooling (420b) is demoulding after the demoulding of a vertical tail plane intermediate tooling not shown in the figure.

Figures 5A, 5B:
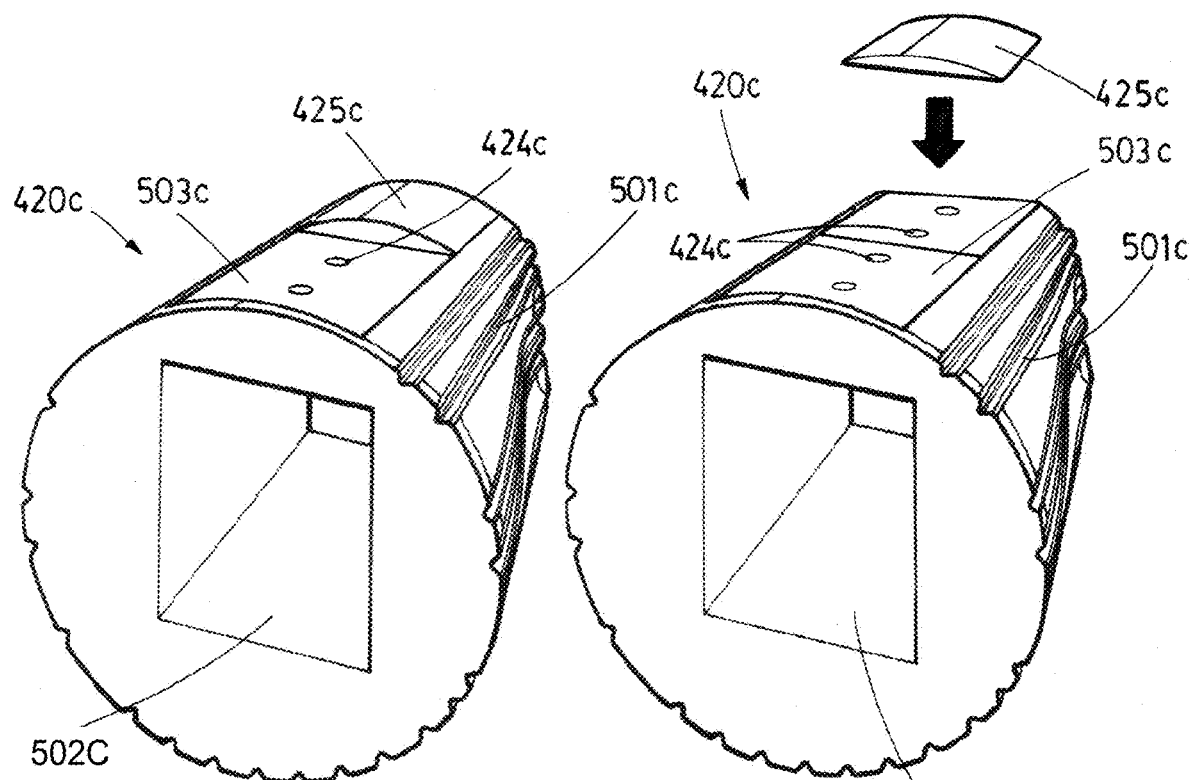
FIGS. 5A and 5B show a third tool to obtain the fuselage barrel according to the present disclosure.

FIG. 5 shows an alternative example of a fuselage barrel tooling (420c) used to obtain the fuselage barrel as part of the fuselage and vertical tail plane assembly. The fuselage barrel tooling (420c) shown in part a) of FIG. 5 and part b) of FIG. 5 also comprises an external surface that copies the internal surface of the fuselage and stringers and an internal longitudinal cavity (502c). It also comprises external longitudinal cavities (501c) established on the external surface of the barrel to allocate composite stringer laminates and an upper cut-out (503c) located on the upper part, that allows the installation of the vertical tail plane tooling.

As showed in part a) and b) of FIG. 5, the fuselage barrel tooling (420c) comprises an additional rear part (425c) that is attached by detachable mechanical means that allows the demoulding of the fuselage barrel tooling (420c) in more than one step. The fuselage barrel tooling (420c) can be demoulded in a first step before the demoulding of the vertical tail plane intermediate tooling, contrary to the fuselage barrel tooling (420b) of FIG. 4B and (420a) of FIG. 4A. The vertical tail plane intermediate tooling assembly and the additional rear part (425c) of the fuselage tooling (420c) can be demoulded on a latest step, providing the advantage that the vertical tail plane tooling does not need to be demoulded through the inside of the fuselage tooling (420c), having more internal space inside the fuselage without this tooling and easing this demoulding process. In the presented embodiment the vertical tail plane assembly tooling and the rear part (425c) are attached to the fuselage barrel tooling (420c) by means of vertical bolts, not showed on the figure, that go through specific holes (424c) and are installed from the inside by an additional internal longitudinal cavity (502c) on the fuselage barrel tooling (420c). In this case the upper cut-out (503c) located on the upper part is not fully communicated with internal longitudinal cavity (502c) to allow the demoulding of the vertical tail plane intermediate tooling though the fuselage barrel tooling (420c) that is not necessary in this embodiment, so that this internal longitudinal cavity (502c) can be much smaller and simpler only required for the installation and uninstallation of the bolts.

Figure 6:
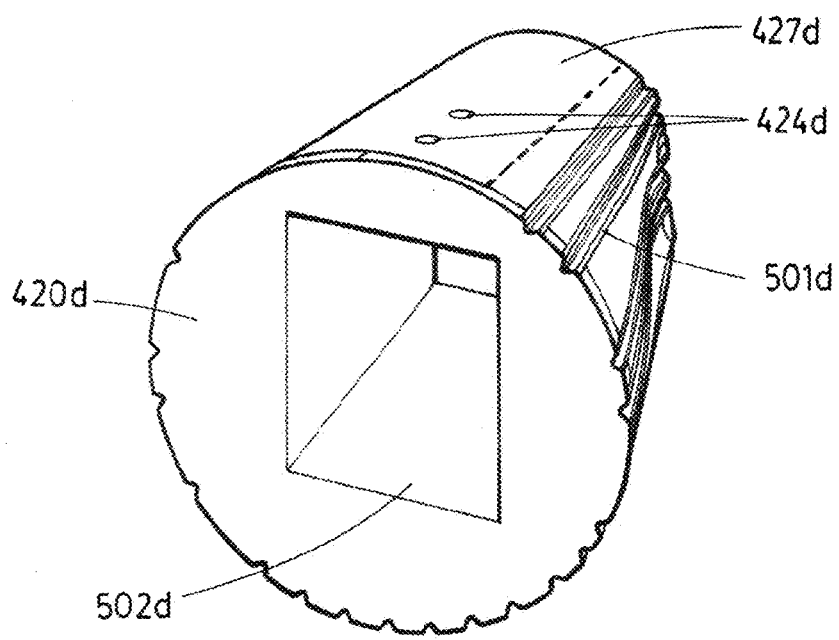
FIG. 6 shows a fourth tool to obtain the fuselage barrel according to the present disclosure.

FIG. 6 shows another example of a fuselage barrel tooling (420d) used to obtain the fuselage barrel as part of the fuselage and vertical tail plane assembly. The fuselage barrel tooling (420d) also comprises an external surface that copies the internal surface of the fuselage and stringers and an internal longitudinal cavity (502d). It also comprises external longitudinal cavities (501d) on the external surface of the barrel to allocate composite stringer laminates. In this embodiment instead of having a cut-out on the upper part, it comprises a concave face (427d) that follows the geometry of the fuselage skin to which the vertical tail plane assembly is attached by detachable mechanical means. When a vertical plane tooling assembly lower zone is in contact with this concave face (427d) of the fuselage barrel tooling (420d), it adapts to this surface without blocking the longitudinal demoulding of the fuselage barrel tooling (420d). Hence, the fuselage barrel tooling (420d) can be demoulded before the vertical tail plane intermediate tooling assembly and provide equivalent advantages as the previous example but with a simpler fuselage tooling (420d) which is formed by a single piece (e.g. it does not comprise an additional rear part (425c)). In order to achieve this, the normal directions of the contact surfaces between the fuselage barrel tooling (420d) and the vertical plane tooling assembly lower zone have a positive projection with the fuselage barrel tooling (420d) demoulding longitudinal direction.

In this example, the fuselage barrel tooling (420d) and the vertical tail plane assembly tooling are attached by means of vertical bolts (not showed on the figure) that go through specific holes (424d) which can be installed from the inside by the additional internal longitudinal cavity (502d) on the main fuselage tooling (420d). In this case the internal longitudinal cavity (502d) is not required to allow the demoulding of the vertical tail plane tooling though the fuselage barrel tooling (420d), so that this internal longitudinal cavity (502d) can be much smaller and simpler only required for the installation and uninstallation of the bolts.

Figure 7A:
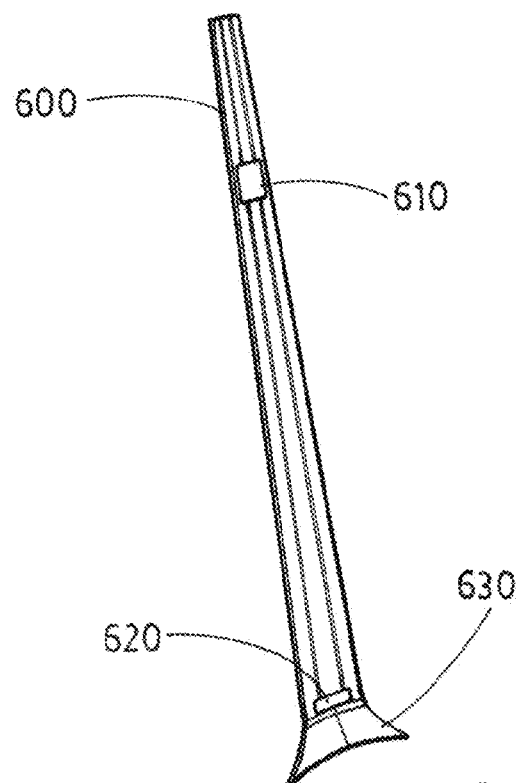
FIG. 7A shows a first example of a collapsible tooling as part of a vertical tail plane tooling assembly.
Figure 7B:
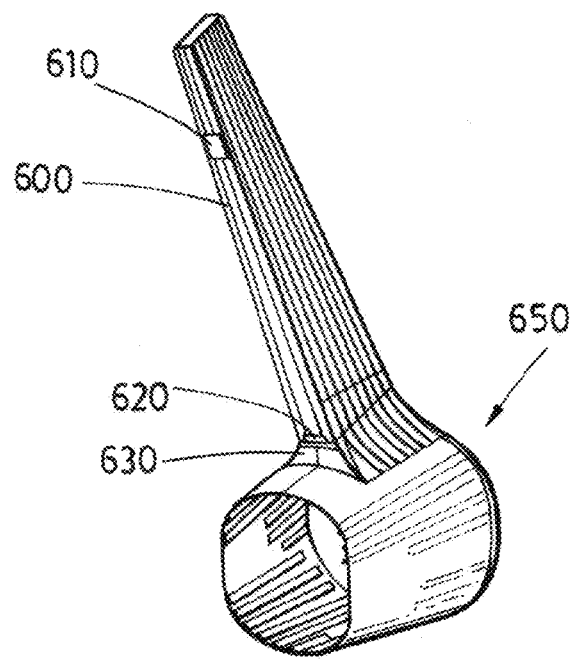
FIG. 7B shows an overall view of the first example of the collapsible tooling with the vertical tail plane and fuselage tooling.
Figure 7C:
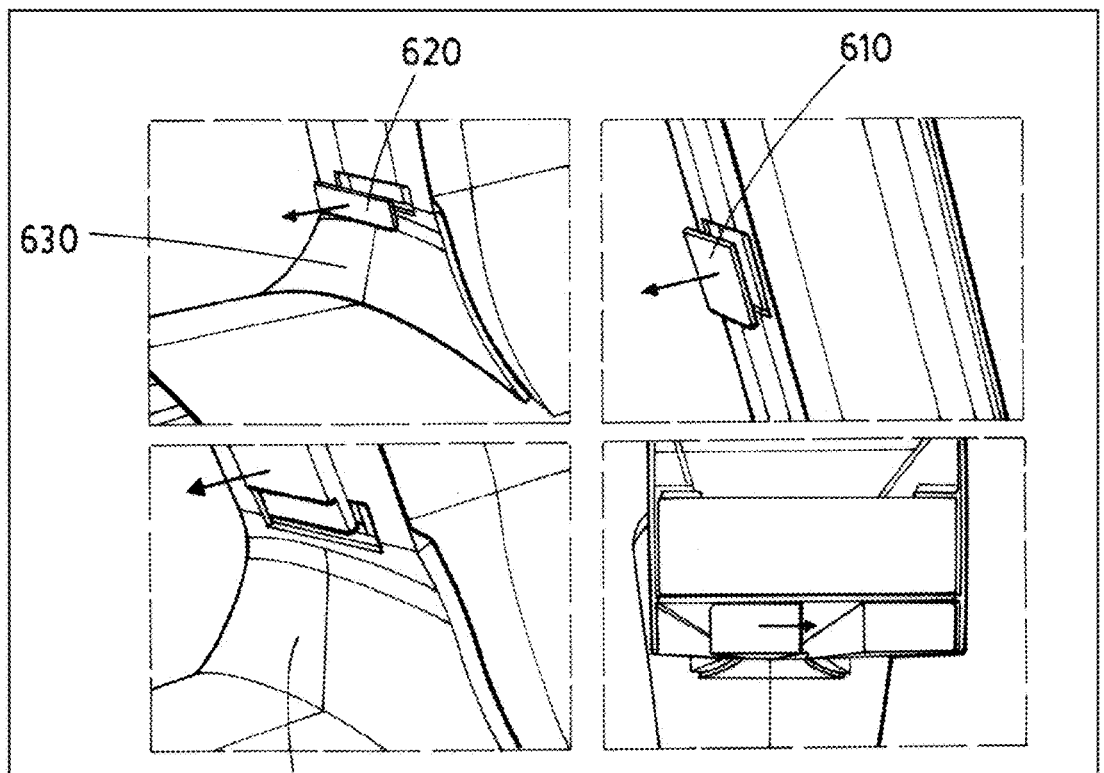
FIG. 7C shows the demoulding process of the first collapsible tooling according to the present disclosure.

FIG. 7A shows a first collapsible tooling (600) used to obtain the vertical tail plane tooling assembly as part of the fuselage and vertical tail plane assembly according to the present disclosure. The collapsible tooling is an assembly of mold components that form an outer surface to be used to mold an internal surface of a vertical tail plane. The tooling (600) can correspond to either the front or the rear spar tooling as part of the vertical tail plane tooling assembly. The tooling (600) is comprised by four parts and two joint plates (610) and (620) to allow an easy demoulding process that is showed in FIG. 7C. It also comprises a widening shape (630) at the root to adapt to the skin transition between the empennage and fuselage at the front or rear spar zones. On FIG. 7B, it is shown the position of the tooling (600) at the rear spar on the fuselage and vertical tail plane tooling assembly (650). FIG. 7C shows the demoulding process of the tooling (600). The four parts and two joint plates (610) and (620) are easily removed as shown in this figure.

Figure 8A:
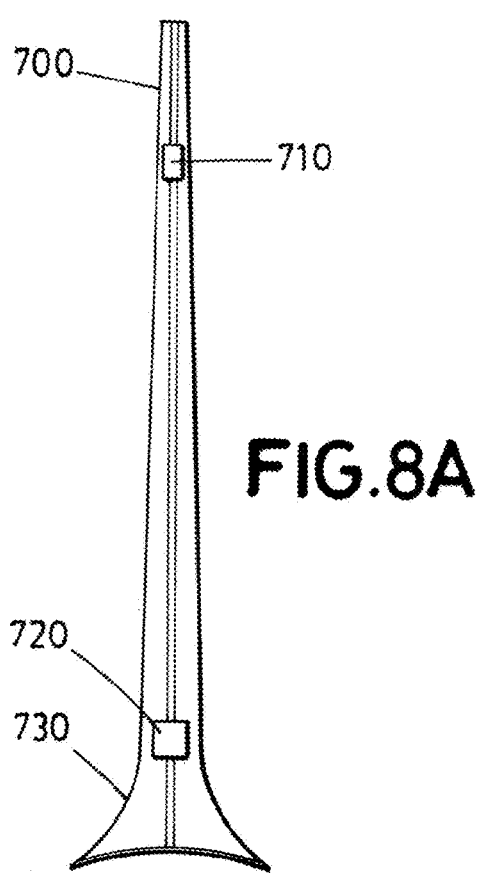
FIG. 8A shows a second example of a collapsible tooling as part of a vertical tail plane tooling assembly.
Figure 8B:
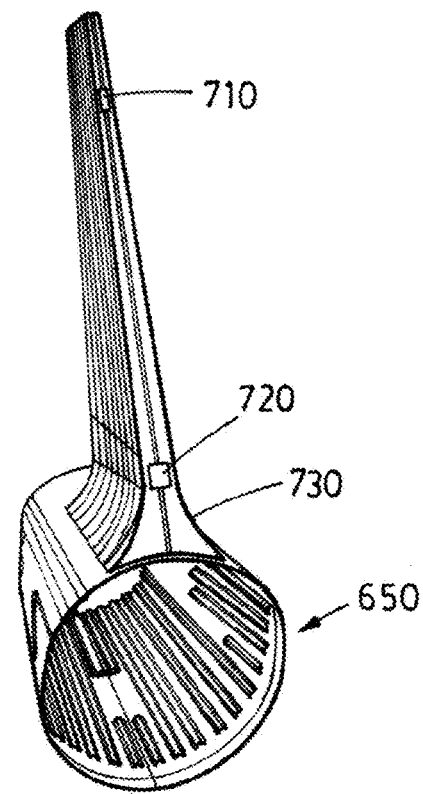
FIG. 8B shows an overall view of the second example of the collapsible tooling with the vertical tail plane and fuselage tooling.
Figure 8C:
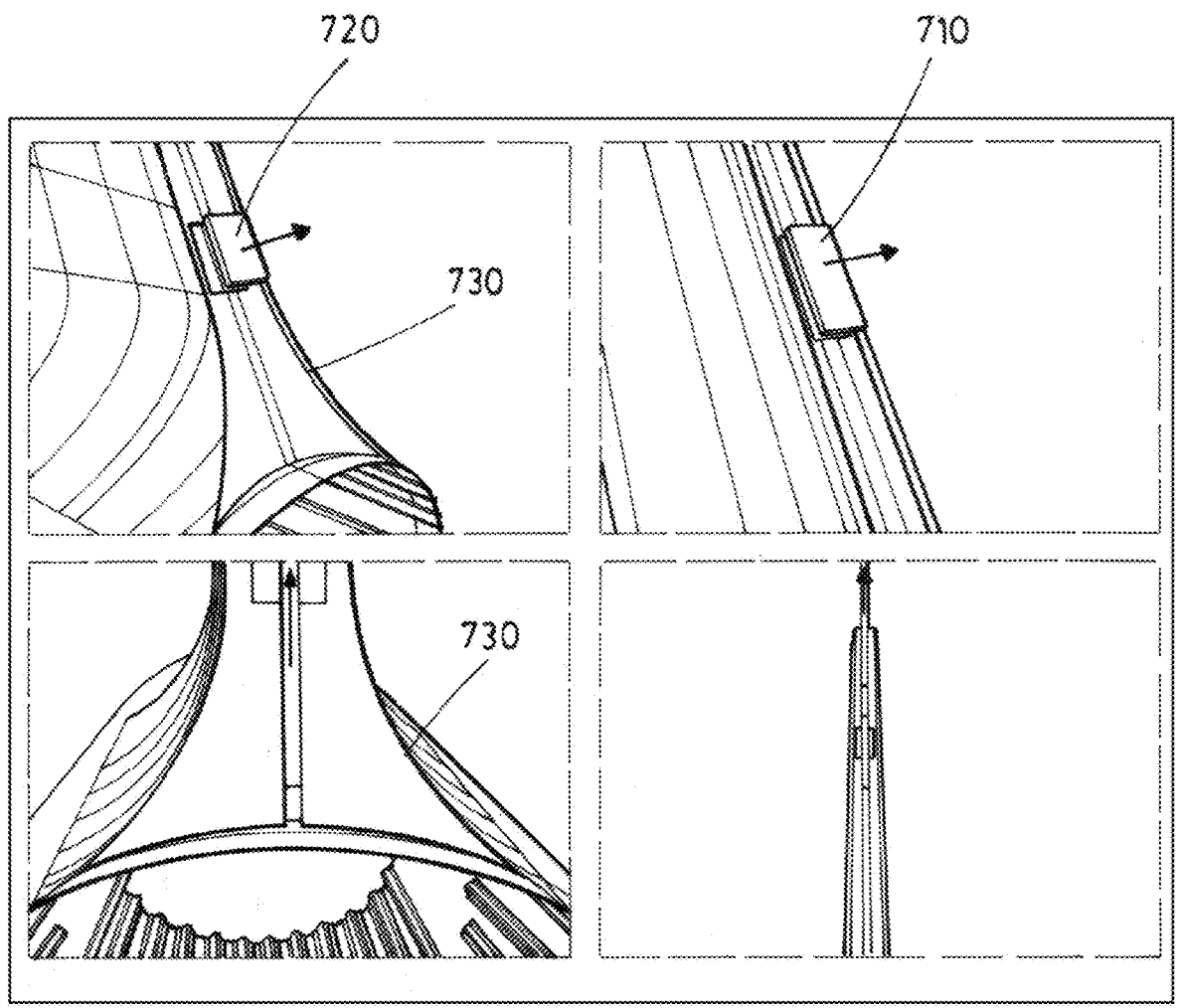
FIG. 8C shows the demoulding process of the second collapsible tooling according to the present disclosure.

FIG. 8A shows a second collapsible tooling (700) used to obtain the vertical tail plane as part of the fuselage and vertical tail plane assembly according to the present disclosure. The second collapsible tooling (700) can correspond to either the front or rear spar tooling of the vertical tail plane tooling assembly. The second collapsible tooling (700) is comprised by three parts and two joint plates (710) and (720) to allow an easy demoulding process that is showed on FIG. 8C. It also comprises a widening shape (730) at the root to adapt to the skin transition between the empennage and fuselage at the front or rear spar zones. On FIG. 8B, it is shown the position of the tooling (700) at the front spar on the fuselage and vertical tail plane assembly tooling (650). FIG. 8C shows the demoulding process of the second collapsible tooling (700). The three parts and two joint plates (710) and (720) are easily removed as shown in this figure.

As mentioned, the first collapsible tooling (600) shown in FIG. 7 and the alternative second collapsible tooling (700) shown in FIG. 8 can be used indistinctly for the rear of front spar, being the difference between them that in the first collapsible tooling (600) the middle part is demoulded in a direction perpendicular to the spar plane while on the second collapsible tooling (700) the middle part is demoulded in the longitudinal direction of the spar.

Figure 9A:
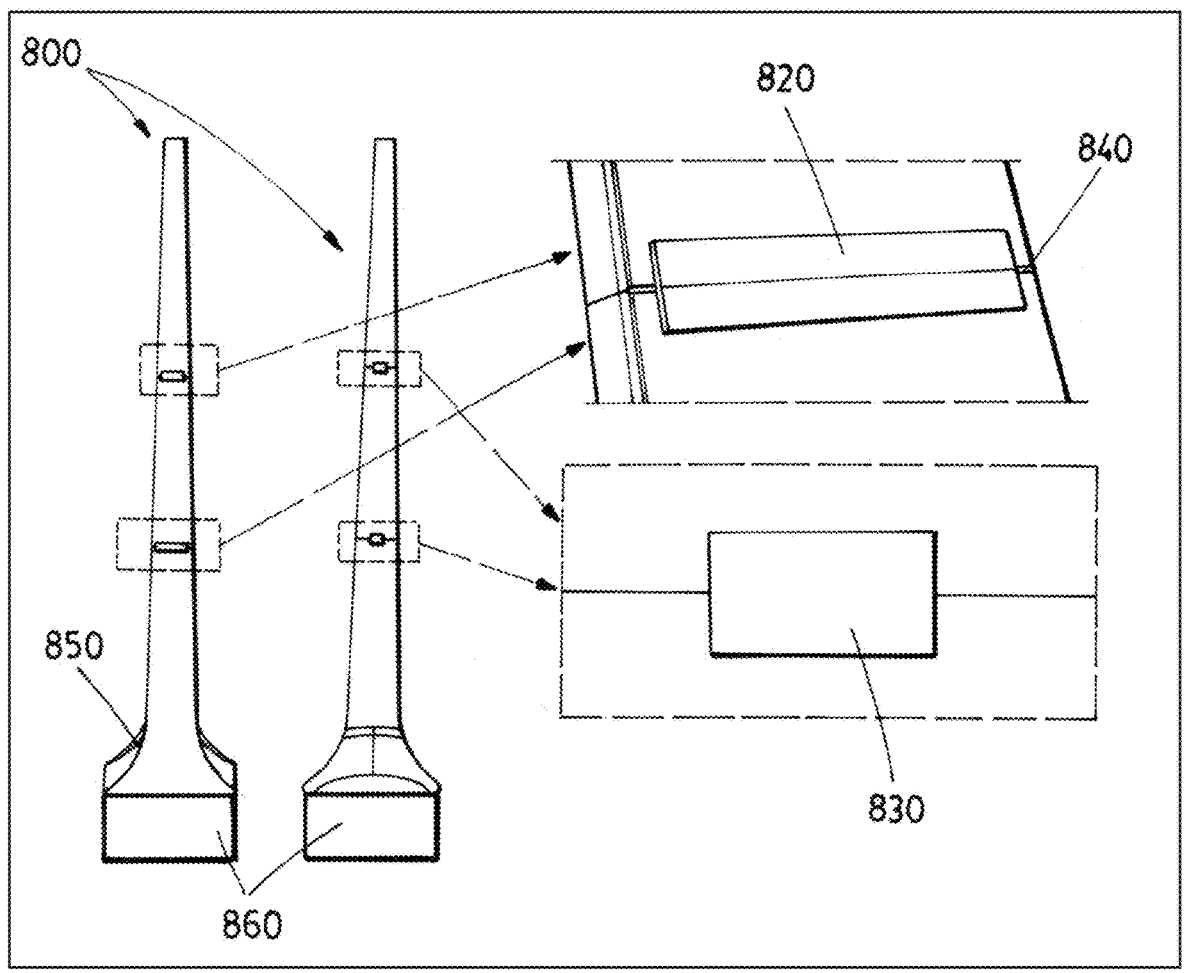
FIG. 9A shows an example of a third collapsible tooling for of intermediate tooling for intermediate spars of a vertical tail plane tooling and its junction pieces.

FIG. 9A shows a third collapsible tooling (800) to obtain the vertical tail plane as part of the fuselage and vertical tail plane assembly according to the present disclosure. This third tooling (800) is used for the intermediate internal part of the vertical tail plane tooling assembly. In the case that only a front and rear spar form the multi-spar vertical tail, only a single third collapsible tooling (800) is required to complete the vertical tail plane tooling. In the case that there are also intermediate laminates to form central spars and/or internal stiffeners, more than one intermediate collapsible tooling may be required. Furthermore, the intermediate tools may need to include the composite formed laminate of such parts. The third collapsible tool (800) for intermediate internal parts of the vertical tail plane is conditioned by the fact that the vertical tail plane length is longer than the fuselage section diameter and that the continuous fuselage and empennage skin are cured before demoulding this tool (800), so that the intermediate collapsible tool (800) must be demoulded by accessing the inside of the fuselage tooling or fuselage structure, depending on the example. As consequence, this tool (800) must bend and comply with a special demoulding process. For the particular example showed on FIG. 9A, the third collapsible tooling (800) comprises two hinges (820) to allow bending of the tooling and two joint plates (830) and two corner parts (840) to block the bending of the tooling. This tooling (800) also comprises a widening shape (850) at the root to adapt to the skin transition of the fuselage. In this embodiment, the tooling (800) also comprises a root join part extension (860) that fits inside the fuselage tool cut-out (e.g. cut-out 503a and 503b of FIGS. 4A and 4B, respectively or cut out 503c of FIG. 5) and it contains fixation allocations to allow its attachment to the internal structure of the fuselage tooling by means of mechanical removal fixations as bolts and/or additional junction parts.

Figure 9B:
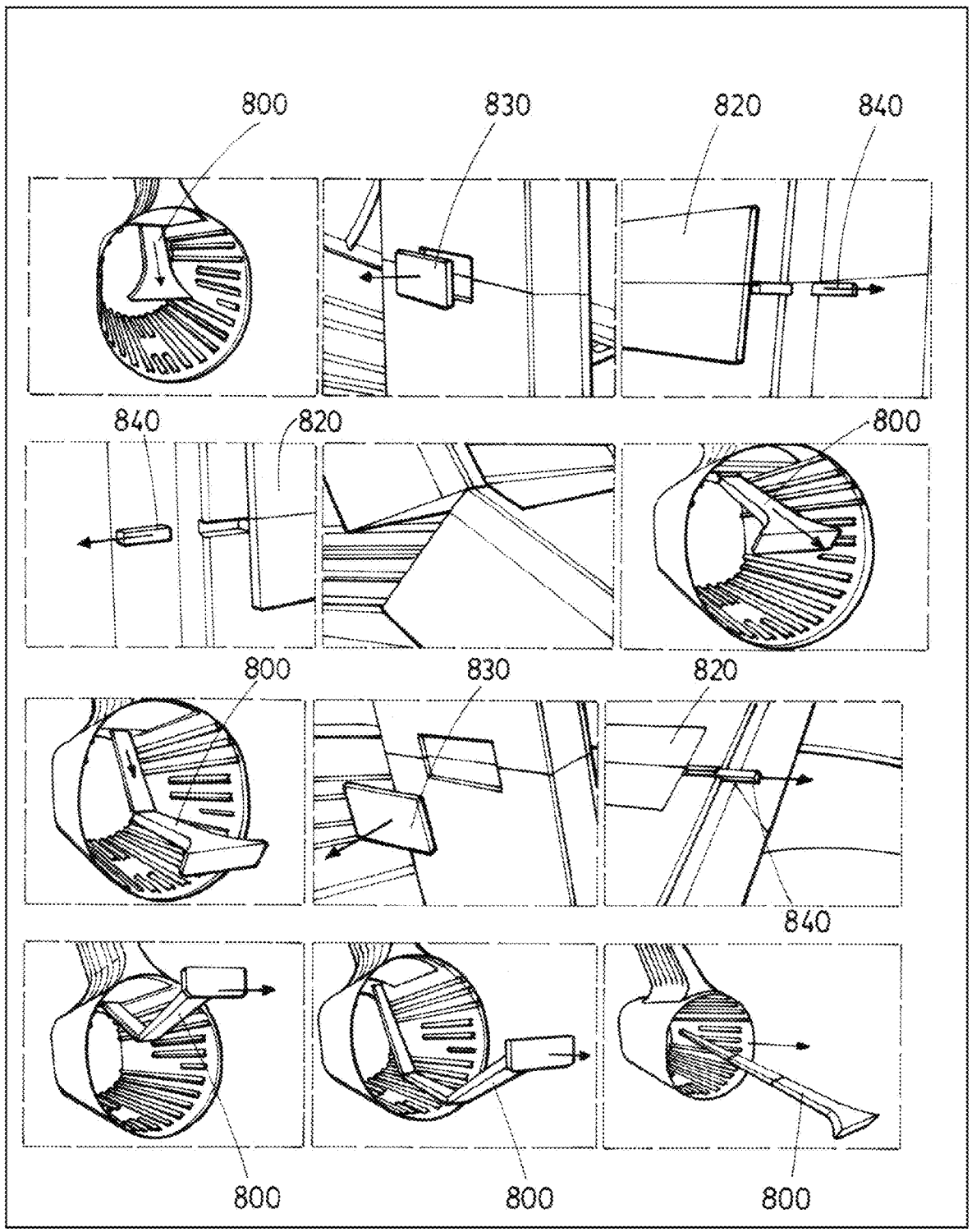
FIG. 9B show a demoulding process of an internal preforms tool to obtain the fuselage assembly according to the present disclosure.

The demoulding process of this tooling (800) for this particular example is shown in FIG. 9B and is composed of the step of descending the tooling (800) through the cut-out until the first joint plate (830) and corner part (840) are accessible, then these parts are removed to allow the bending of the tooling (800) that permits the descending and removal of the tool (800) from the fuselage and vertical tail plane tool assembly without touching the fuselage tooling or fuselage skin. Similarly, once the second joint plate (830) and corner part (840) are accessible, they are also removed to allow the bending of additional segment of the tooling that permits the descending and removal of the tool without touching the fuselage tooling or fuselage skin to permit the final full demoulding of the tooling.

For the alternative example in which the fuselage tooling does not comprise a cut-out located on the upper part in the interface zone with the vertical tail plane, but does comprise an upper concave face (see reference 427d in FIG. 6), the root joint part of the vertical tail plane intermediate tooling (800) has a cavity (861) that adapts to this upper surface of the fuselage tooling (427d) without blocking its demoulding in the longitudinal direction of the fuselage as already mentioned.

In the proposed example, the tooling (800) also allocates the screwed holes on its concave surface (not showed on the figure) to attach the vertical bolts joining the fuselage tooling and the vertical tail plane tooling assembly.

Figure 10:
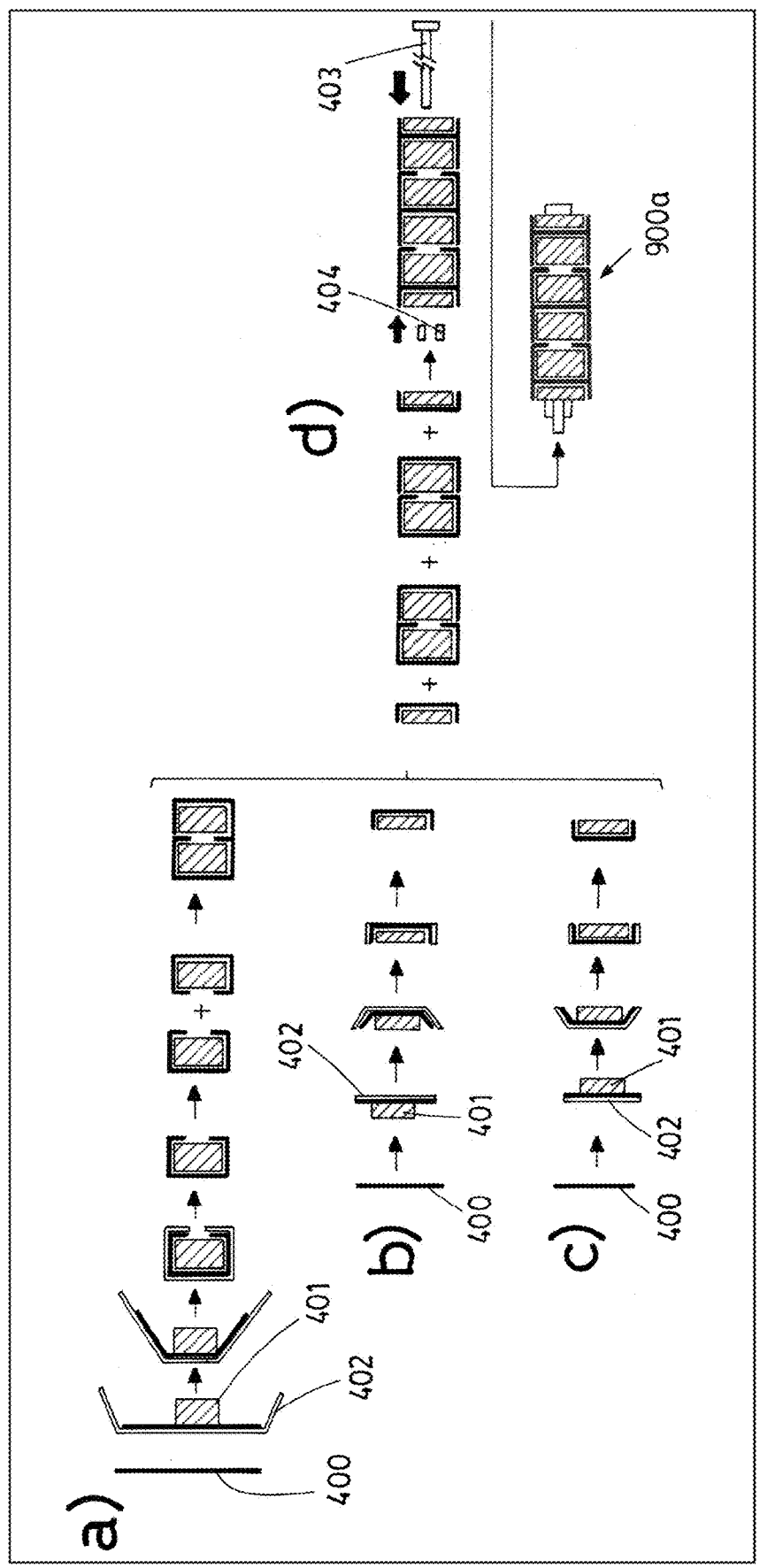
FIGS. 10 and 11 show a first process of manufacturing a vertical tail plane tooling assembly and a resulting multispar vertical tail plane having a skin lay-up according to the present disclosure.

FIG. 10 shows a process of manufacturing a vertical tail plane tooling assembly (900a) according to the present disclosure. The present disclosure defines the multispar vertical tail plane having intermediate preforms corresponding to central spars and/or intermediate stiffeners and optionally a front spar, a rear spar. In this process, for each spar and/or stiffener a composite laminate (400) is manufactured by for example a flat advanced fibre placement process, followed by hot forming process to obtain the final shape of the laminates that form the spars and stiffeners of the vertical tail plane. This forming process uses a set of rigid forming tools (401) and flexible forming tools (402) where the composite laminates for each different spar and stiffener sections are folded by means of pressure and temperature and cured.

Once each composite laminate is put in form, the flexible forming tool (402) is removed and the rigid forming tools (401) that included the formed laminates are assembled together to form the vertical tooling assembly (900a).

Parts a) to d) of FIG. 10 show section cut schematic views normal to the span of the vertical tail plane, that represent this manufacturing process. It is show in part a) of FIG. 10 that there is a set of tools of third type (e.g. collapsible tooling (800) shown in FIG. 9) that form the intermediate structure of the vertical tail plane tooling. It is shown in part b) of FIG. 10 that there is a tooling that forms the rear spar that optionally can be joined to the vertical tail plane, and in part c) of FIG. 10 that a different tooling forms the front spar that optically can be joined to the vertical tail plane. The tools forming the front and rear spars can be of the first type (600) showed on FIG. 7 and/or of the second type (700) showed on FIG. 8. Part d) shows the attachment of the spars tooling to complete the vertical tail plane tooling assembly (900a). FIGS. 10 to 15 show examples of vertical tail planes obtained by using proposed vertical tail plain tools according to the present disclosure. With regard to these figures, in a preferred example, the vertical tail plane tooling is only comprised by the tools for the intermediate preforms. In other alternatives, the vertical tail plane tooling is the result of joining tools for the rear spar, the front spar and the intermediate preforms.

Part a) of FIG. 10 shows the schematic process of using more than one of the third intermediate tooling type (800) to form the internal spars and stringers formed laminate. Part b) of FIG. 10 shows the schematic process of using tool of first type (600) as rigid forming tooling (401) to form the rear spar formed laminate. Part c) of FIG. 10 shows the schematic process of using the tool of first type (600) as rigid tooling (401) to form the front spar formed laminate.

Part d) of FIG. 10 shows the assembly process of the different tools e.g. (600) and (800) that includes each respective formed composite laminate that are placed in position relative to each other. The assembly is kept in place by means of a mechanical removable attachment that in the proposed embodiment is performed by means of bolts (403) that passes through specific holes on the tools and perform in a direction perpendicular to the spars plane, that are distributed in several positions along the span of the empennage as needed and that are screwed (404) to a nut at its extremity. Alternatively, a specific system as e.g. clamps to provide pressure at the lateral part of the front and rear spar tooling could be used to replace the bolt and nut system with the advantage of not requiring to perform specific holes on each tooling and formed laminate.

Figure 11:
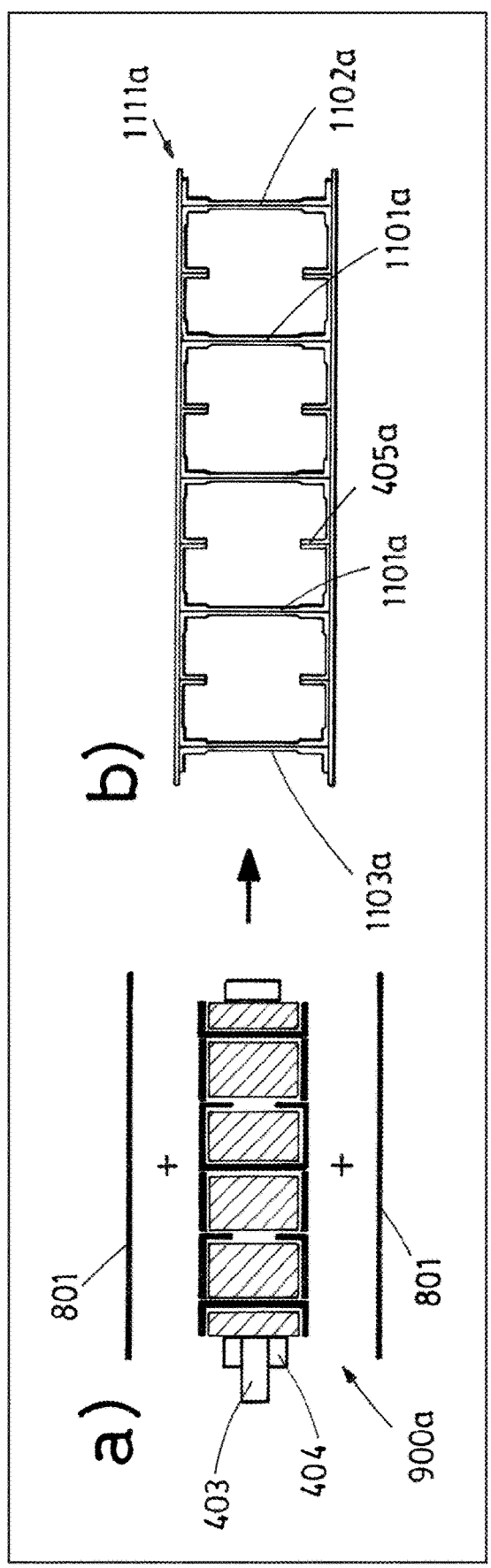

Part a) of FIG. 11 shows a section cut view normal to the span of the vertical tail plane tooling assembly (900a) and a schematic process of the lay-up of the skin laminate (801) that is over the two opposite sides of the vertical tail plane and fuselage tooling assembly.

Part b) of FIG. 11 shows a section cut view normal to the span of the empennage of the resulting empennage box (1111a), that represents the final configuration of the empennage structure once the assembly is cured and the attachment means and tools are removed. As it can be seen in the figure in the proposed example, the box (1111a) comprises a rear spar (1103a) a front spar (1102a) and wherein the middle spars preform (1101a) have a C-shape that covers almost the full perimeter of the rigid intermediate tool of third type (800) with verticals flanges at the extreme of the C shape that form and intermediate flange stiffener (405a) of the box. The resulting empennage box (1111a) also comprises torsion box panels (1105a).

Figure 12:
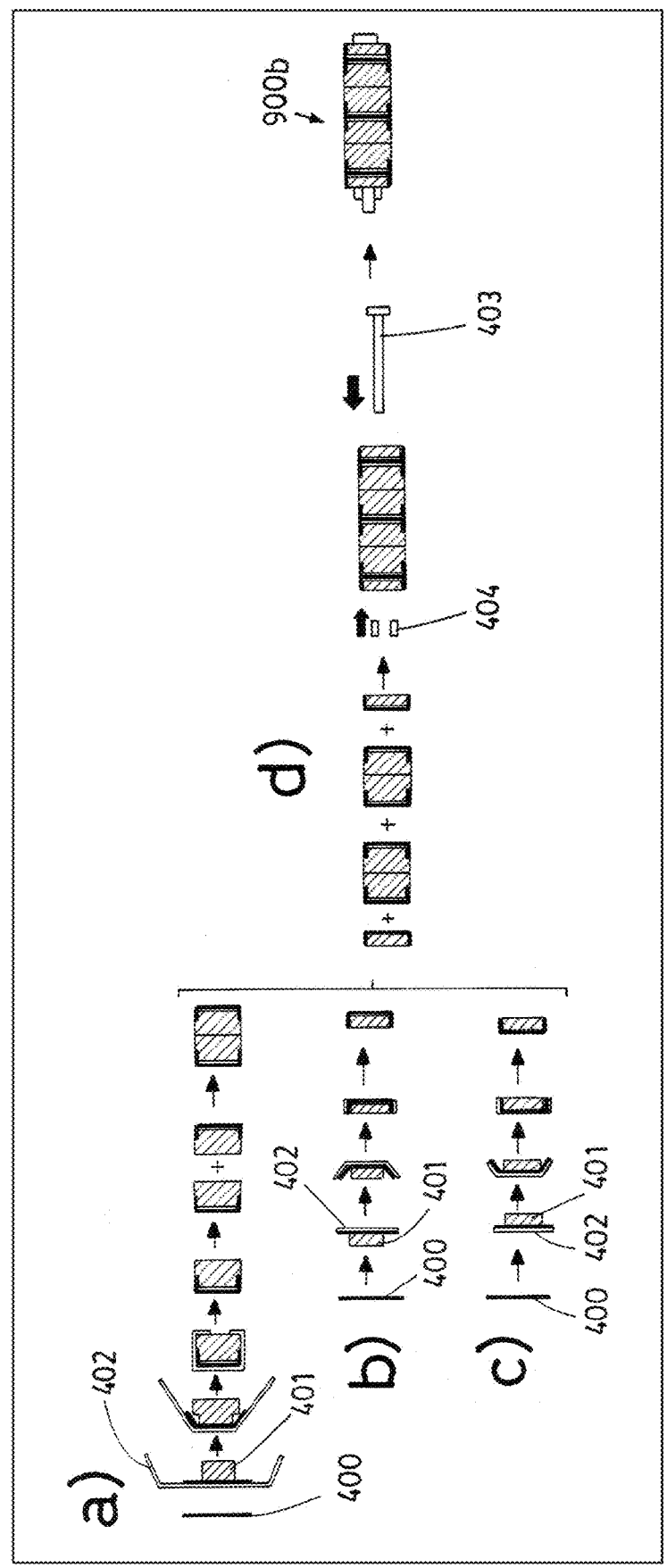
FIGS. 12 and 13 show a second process of manufacturing a vertical tail plane tooling assembly and a resulting multispar vertical tail plane having a skin lay-up according to the present disclosure.

Parts a) to d) of FIG. 12 show section cut schematic views normal to the span of the vertical tail plane, that represent the manufacturing process. It is show in part a) of FIG. 12 that there is a set of tools of third type (e.g. collapsible tooling (800) shown in FIG. 9) that form the intermediate structure of the vertical tail plane tooling. It is shown in part b) of FIG. 12 that there is a tooling that forms the rear spar of the vertical tail plane, and in part c) of FIG. 12 that a different tooling forms the front spar of the vertical tail plane. The tools forming the front and rear spars can be of the first type (600) showed on FIG. 7 and/or of the second type (700) showed on FIG. 8 and can be optionally joined to the vertical tail plane. Part d) shows the attachment of the spars tooling to complete the vertical tail plane tooling assembly (900b).

Figure 13:
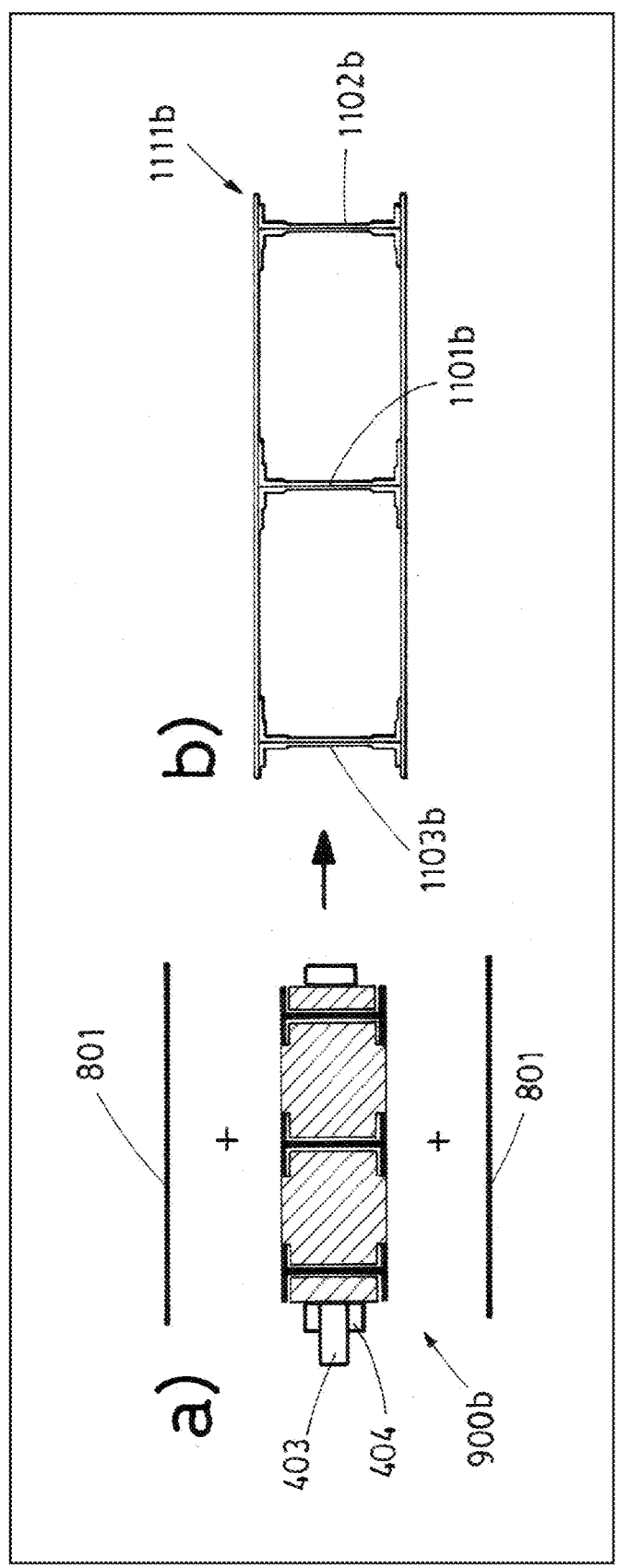

Part a) of FIG. 13 shows a section cut view normal to the span of the vertical tail plane tooling assembly (900b) and a schematic process of the lay-up of the skin laminate (801) that is over the two opposite sides of the vertical tail plane and fuselage tooling assembly. Part b) of FIG. 13 shows a section cut view normal to the span of the empennage of the resulting empennage box (1111b), that represents the final configuration of the empennage structure once the assembly is cured and the attachment means and tools are removed.

In this example shown in FIGS. 12 and 13, the spar C shapes do not cover the full perimeter of the rigid intermediate tool (800), but it only covers a specific cavity on the tool. In this case the final lay-up of the skin laminate (801) that covers the assembly of fuselage and empennage tools is in contact with the intermediate perform in some places and with the tool (800) in some others and provides the continuity of the skin of the torsion box. The resulting empennage box (1111b) comprises front spar (1102b), rear spar (1103b), torsion box panels (1105b) and a single middle spar (1101b).

Figure 14:
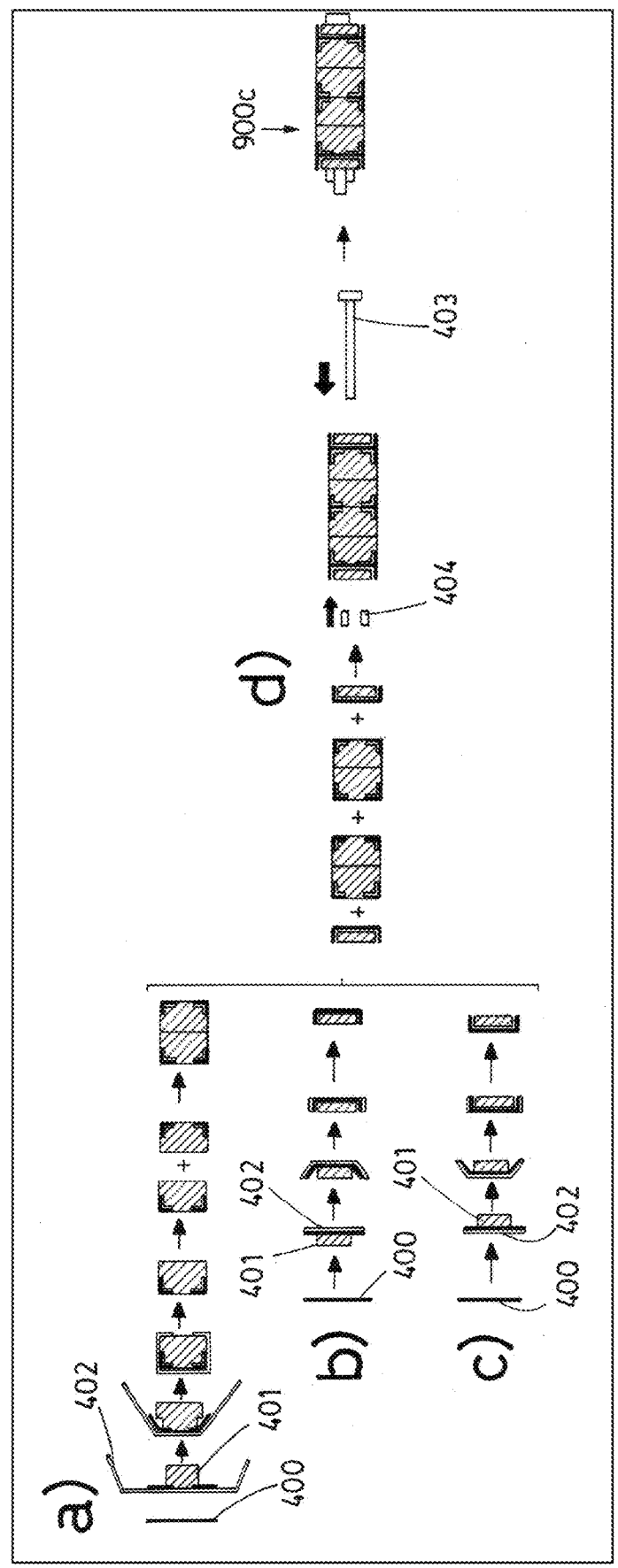
FIGS. 14 and 15 show a third process of manufacturing a vertical tail plane tooling assembly and a resulting multispar vertical tail plane having a skin lay-up according to the present disclosure.

Parts a) to d) of FIG. 14 show section cut schematic views normal to the span of the vertical tail plane, that represent the manufacturing process. It is show in part a) of FIG. 14 that there is a set of tools of third type (e.g. collapsible tooling (800) shown in FIG. 9) that form the intermediate structure of the vertical tail plane tooling. It is shown in part b) of FIG. 14 that there is a tooling that forms the rear spar of the vertical tail plane, and in part c) of FIG. 14 that a different tooling forms the front spar of the vertical tail plane. The tools forming the front and rear spars can be of the first type (600) showed on FIG. 7 and/or of the second type (700) showed on FIG. 8 and can be optionally joined to the vertical tail plane. Part d) shows the attachment of the spars tooling to complete the vertical tail plane tooling assembly (900c).

Figure 15:
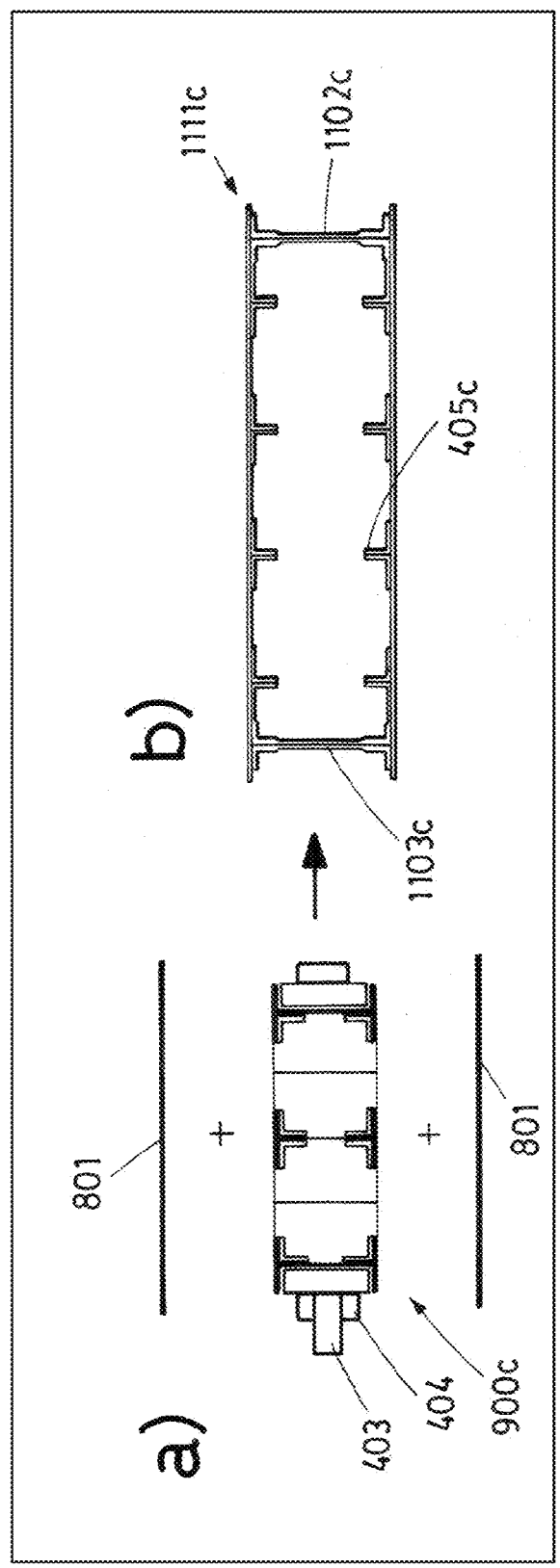

Part a) of FIG. 15 shows a section cut view normal to the span of the vertical tail plane tooling assembly (900c) and a schematic process of the lay-up of the skin laminate (801) that is over the two opposite sides of the vertical tail plane and fuselage tooling assembly. Part b) of FIG. 15 shows a section cut view normal to the span of the empennage of the resulting empennage box (1111c), that represents the final configuration of the empennage structure once the assembly is cured and the attachment means and tools are removed.

In alternative examples shown in FIGS. 14 and 15, the C shapes are replaced by L shapes located at the corners of the perimeter of the rigid intermediate forming tool (401) and they cover only a specific cavity of the tool. In this case the final lay-up of the skin laminate (801) covers in some areas the composite laminate 400 and in others the rigid tool 401 to obtain the continuity of the skin of the torsion box. The intermediate preform does not form a full intermediate spar but just T shape stiffeners, so the resulting multi-spar is formed only by rear and front spar with intermediate stiffeners laminates in between. Alternative, cavities shape on the tooling can produce other skin stiffener shape as L, omega or other section geometries. Different combination of full C-shape and not full C-shape formed laminates and associated cavities on the intermediate tools (800), can be combined to form the required internal reinforcement combination of full intermediate spars and stringers skin reinforcements. In another example, there is a single intermediate tooling that does not include any formed laminate so that only a front spar, a rear spar and the skin laminate lay-up are present. In this case, the internal reinforcement as stringers are added on an additional step. Hence, the resulting empennage box (1111c) comprises front spar (1102c), rear spar (1103c), intermediate flange stiffeners (405c), torsion box panels and no middle spars.

Figure 16:
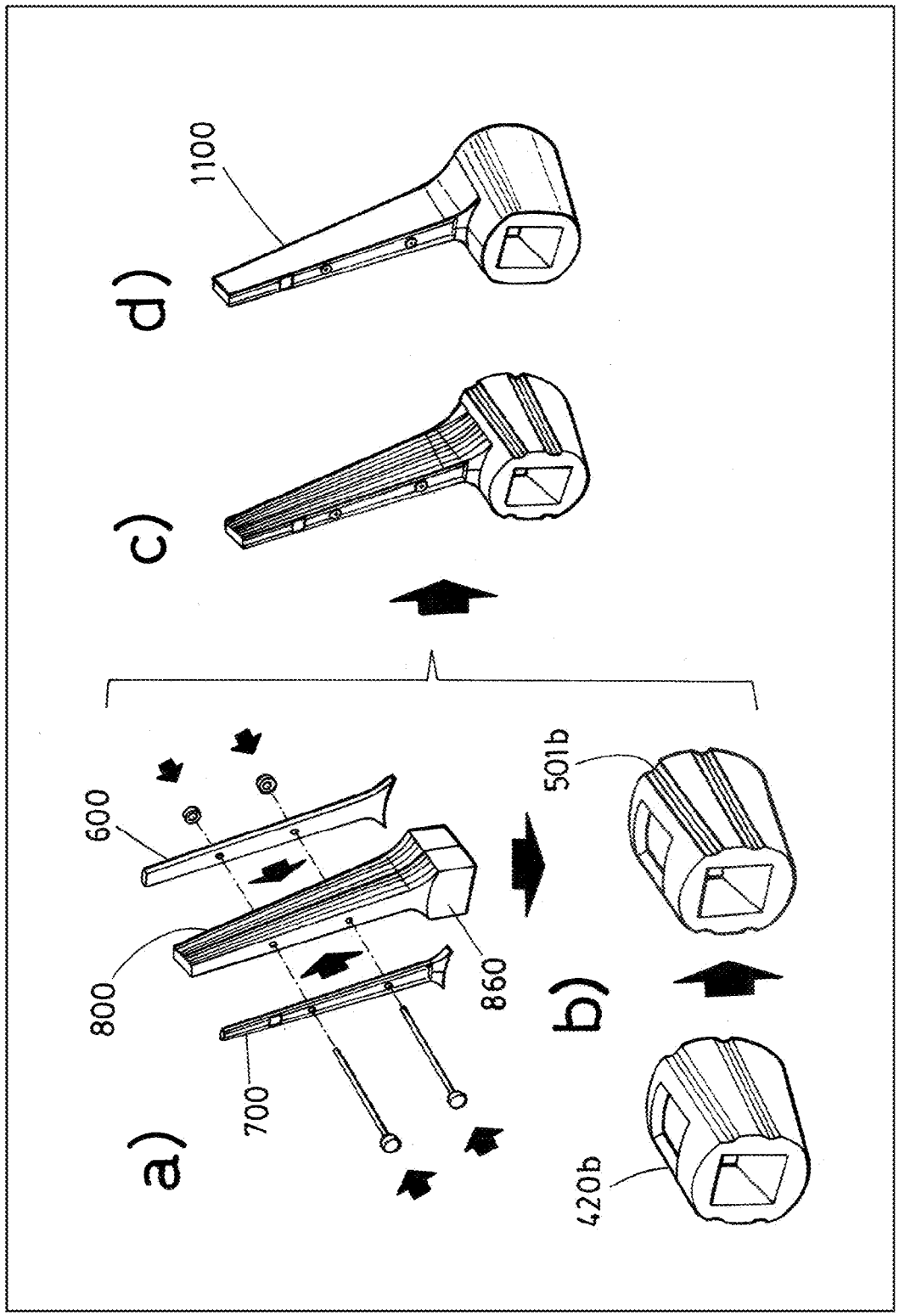
FIG. 16 shows the assembly between the vertical tail plane tooling having an intermediate tooling with widening roots and the fuselage barrel tooling of FIG. 4B and laminate process for the omega stringers and the skin lay-up.

FIG. 16 shows a schematic representation of the vertical tail plane and fuselage tooling assembly and the final step of skin laminating the vertical tail plane and the fuselage barrel on a preferred embodiment with the fuselage tooling (420b) showed on FIG. 4b, the vertical tail plane intermediate tooling (800) having a root join part extension (860) showed on FIG. 9 and the collapsible spar tooling (600) and (700) shown in FIGS. 7 and 8.

Part a) of FIG. 16 shows the assembly of the vertical tail plane tooling as described before. The assembly comprises the front spar collapsible tooling (600), the rear spar collapsible tooling using the second collapsible tooling (700) and the fixation axis and screws and the vertical tail plane intermediate tooling (800) having a root join part extension (860).

Part b) of FIG. 16 shows the fuselage barrel tooling (420b) and the step of laminating the omega stringers on the longitudinal cavities (501b) of the fuselage barrel tooling (420b).

Part c) of FIG. 16 shows the assembly of the fuselage barrel tooling that includes the laminate of the fuselage omega stringers and the vertical tail plane tools by entering the root joining part (860) of the intermediate third tooling (800). Tooling (800) comprises the root join part extension (860) that fits inside the fuselage tool cut-out (503b shown in FIG. 4B) and it contains fixation allocations to allow its attachment to the internal structure of the fuselage tooling by means of mechanical removal fixations as bolts and junction parts. The intermediate tooling (800) fits inside the fuselage tool upper cut-out before performing the final lay-up of the skin laminate.

Part d) of FIG. 16 includes the final lay-up (1100) of the skin laminate onto the assembly of the fuselage and vertical tail plane tooling.

Figure 17:
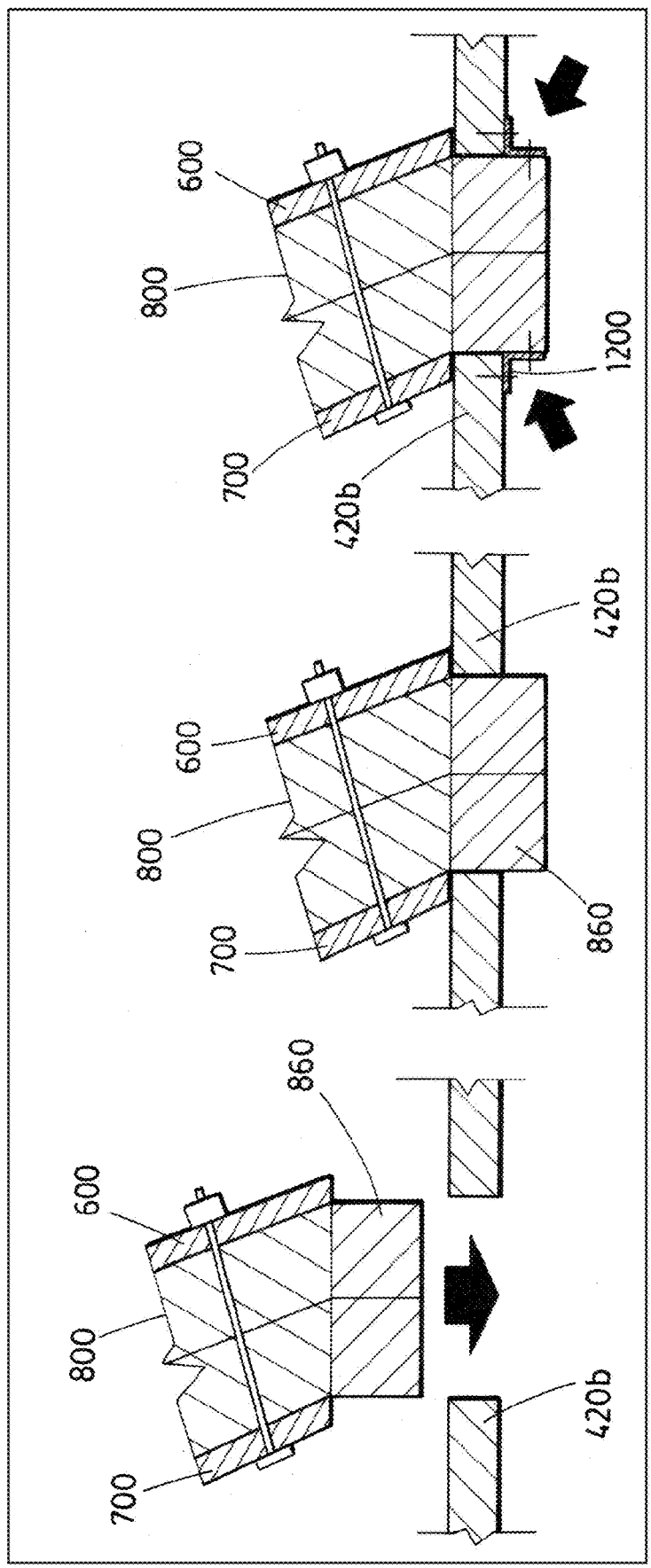
FIG. 17 shows the assembly of the intermediate tooling with widening roots into the fuselage barrel tooling.

FIG. 17 shows a section cut through the symmetrical plane of the fuselage that shows a possible concept of attachment of the vertical tail plane tooling assembly (600), (700) and (800) to the fuselage barrel tooling (420b) by means of angular parts joined with bolts (1200).

Once the empennage and fuselage assembly is finished and in the case where all laminates were pre-impregnated before forming and laying up, the assembly can be cured at ambient temperature, or in an oven or in an autoclave. In the case where laminates were dry or partially dry without the full resin needed for curing, additional step of infusion or resign transmission before curing is needed in order to reach the required resin contain.

Figure 18:
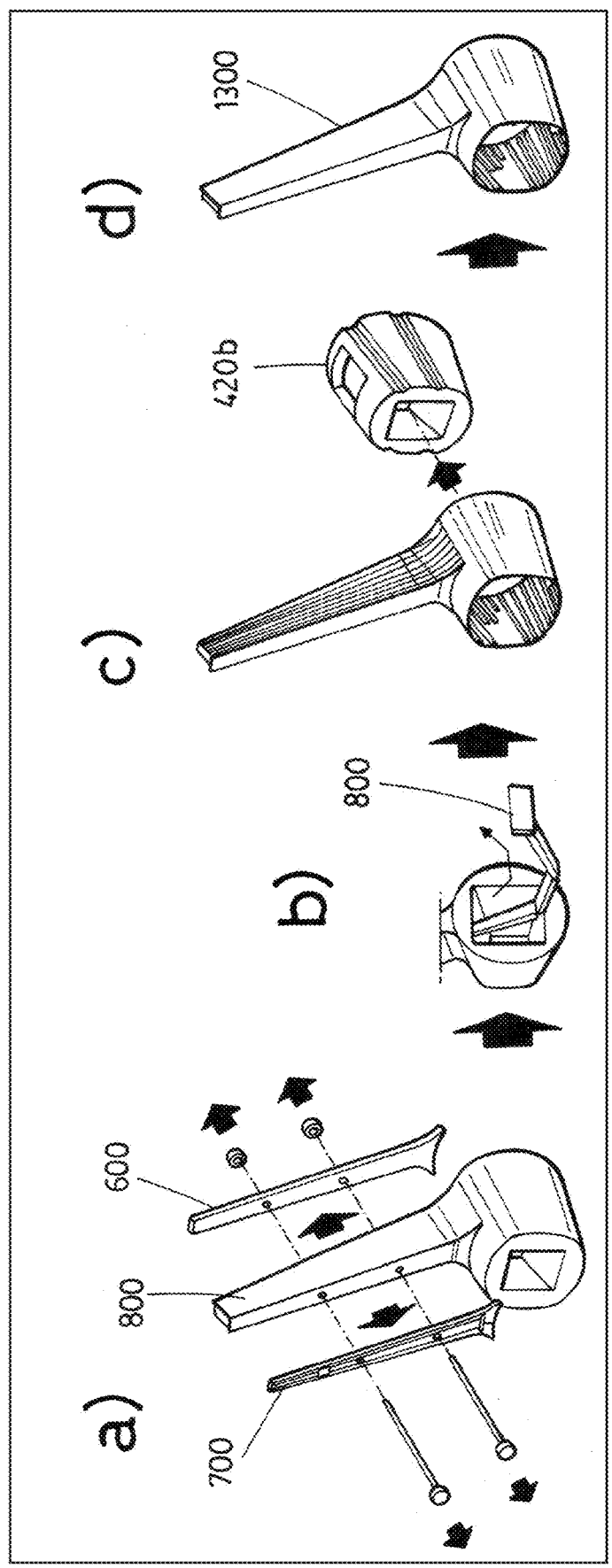
FIG. 18 shows the demoulding process of the vertical tail plane tooling and the fuselage barrel tooling, wherein the intermediate tooling is demoulding before the fuselage barrel tooling.

FIG. 18 shows a schematic representation of the vertical tail plane and fuselage barrel tool disassembly after the curing for the preferred example of FIG. 16. Part a) of FIG. 18 shows the disassembly of the empennage or vertical tail plane tooling with the front spar tooling (600) and the rear spar tooling using the second collapsible tooling (700) and the fixation axis and screws. Part b) of FIG. 18 shows the disassembly of the intermediate fuselage tooling (800) through the cut-out of the fuselage barrel tooling (420b). Part c) of FIG. 18 shows the disassembly of the fuselage barrel tooling (420b) which was shown in FIG. 4b. Part d) of FIG. 18 includes the final composite rear section (1300) with the continuous skin.

Figure 19:
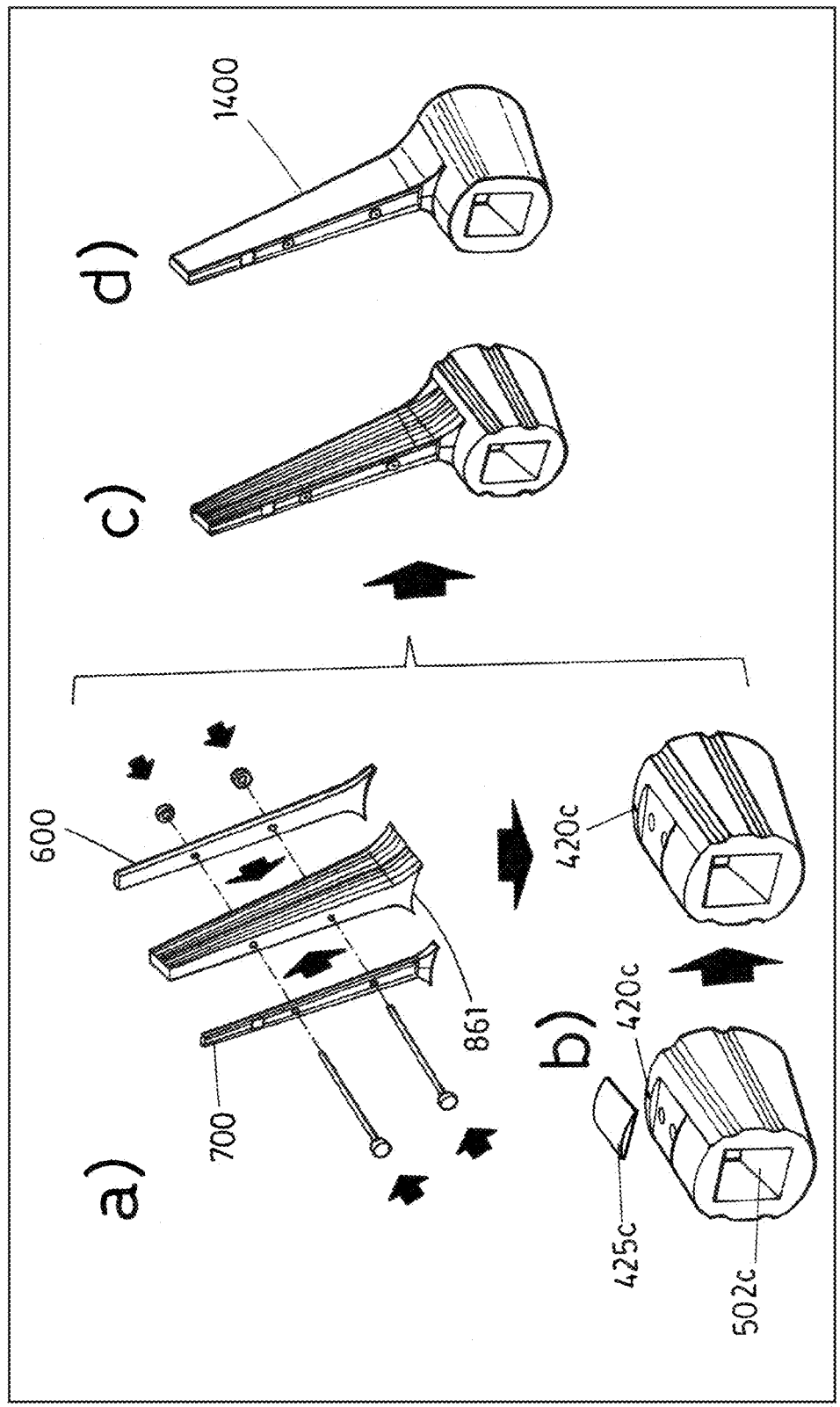
FIG. 19 shows the assembly between the vertical tail plane tooling having an intermediate tooling without widening roots and the fuselage barrel tooling of FIG. 5 and laminate process for the omega stringers and the skin layup.
Figure 20:
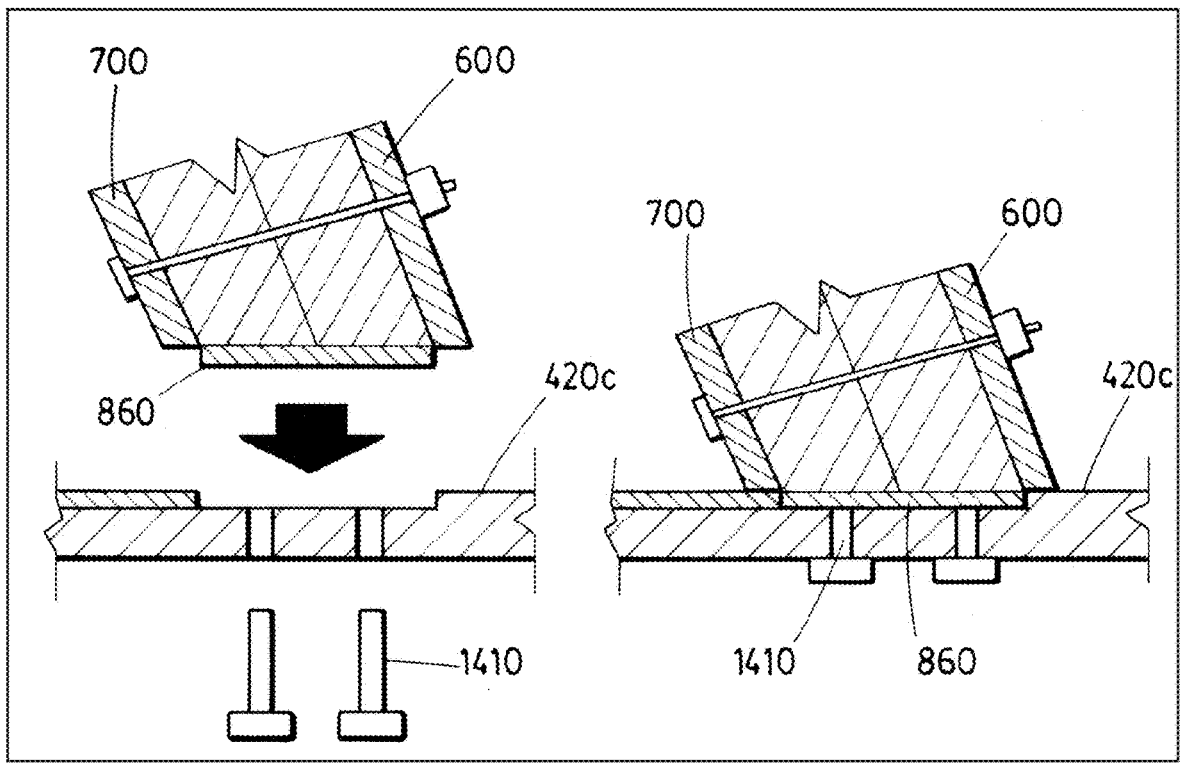
FIG. 20 shows the assembly of the intermediate tooling without widening roots into the fuselage barrel tooling.
Figure 21:
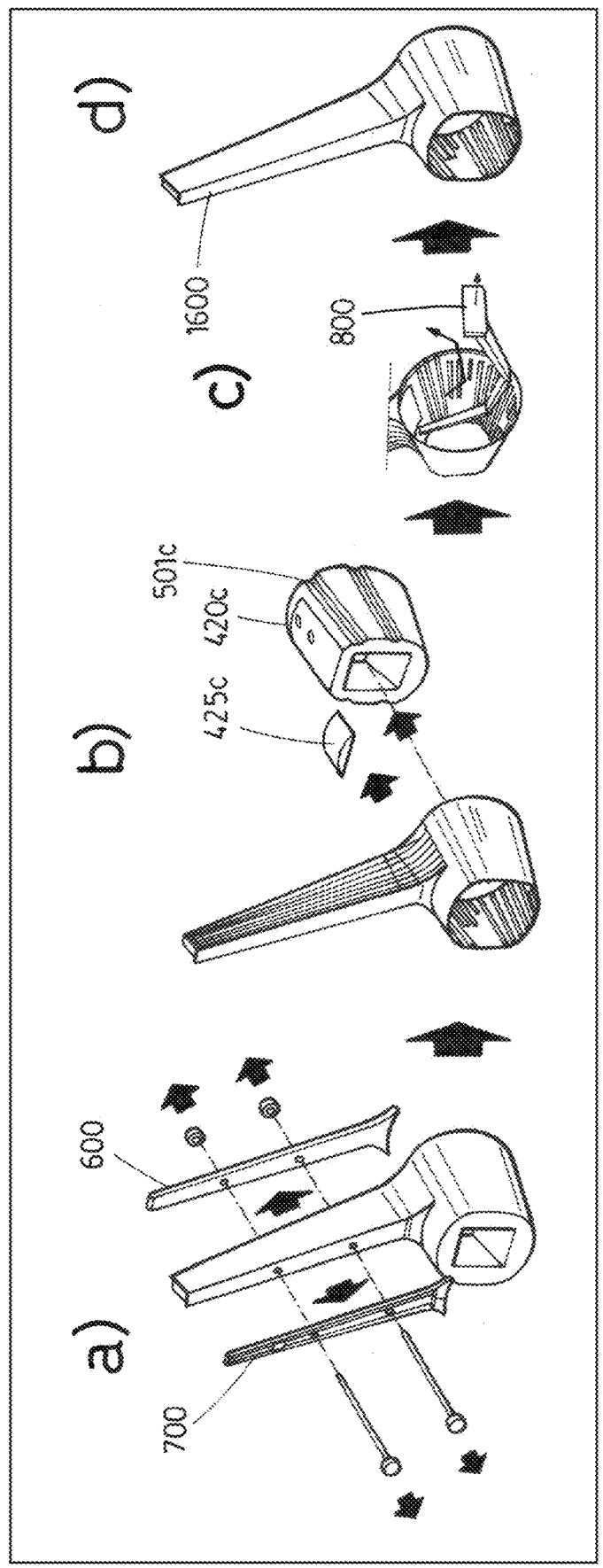
FIG. 21 shows the demoulding process of the vertical tail plane tooling and the fuselage barrel tooling, wherein the intermediate tooling is demoulding after the fuselage barrel tooling.

FIGS. 19 to 21 show equivalent figures as 16 to 18 for additional alternative embodiments in which the vertical tail plane tooling does not enter fully inside of the fuselage barrel tool (420c) of FIG. 5 that has and additional rear part (425c) as showed on FIG. 5 and is attached to external surface of the upper part of the fuselage tooling in the interface zone with the vertical tail plane by means of a bolts (1410) to the easing the assembly process as shown in FIG. 20. FIG. 14 shows the fuselage tooling (420c) which was shown in FIG. 4C. Part d) of FIG. 14 includes the final tooling assembly (1400) with the lay-up of the skin laminate on the assembly of the fuselage tooling.

Additional alternative embodiment as the one showed in FIGS. 19 to 21 (not showed on the figures) in which the fuselage tool is replaced by fuselage tool (420c) as showed on FIG. 5 and the intermediate empennage tooling (800) of the vertical tail plane assembly (900) has a root joint cavity (861) instead of a root joint part extension (860). In this case the fuselage tooling is formed by two parts (as shown in FIG. 5).

In part c) of FIG. 18 is clearly showed that the intermediate vertical tail plane tooling (800) is demoulded before and through the inside of the fuselage tooling (420b) while in part c) of FIG. 21 is clearly showed that the intermediate vertical tail plane tooling (800) is demoulded after the demoulding of the fuselage barrel tooling (420c) and through the inside of the fuselage structure but not through the fuselage barrel tooling (420c).

In an alternative embodiment and additional step could be added after the step showed on parts a) and b) of FIG. 16 and parts a) and b) of FIG. 19 for performing a first thin lay-up of the empennage skin and/or the fuselage before the assembly of fuselage and empennage tooling. In this case a final step of laying the fuselage and empennage skin with the common remaining skin thickness is performed.

Figure 22:
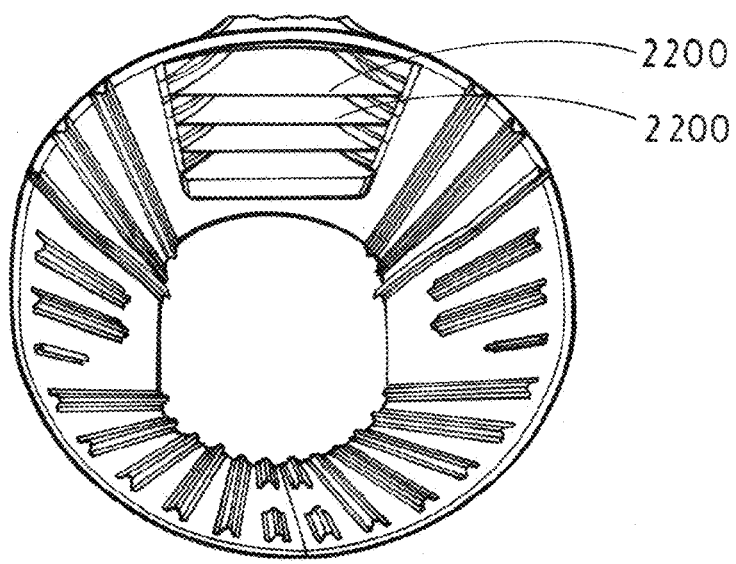
FIGS. 22 and 23 show different views of the final composite assembly.

FIG. 22 shows additional detailed view of a proposed assembly according to the present disclosure. FIG. 22 shows a front view from though the inside of the fuselage, where the empennage intermediate spars (2200) are visible on the upper internal part of the fuselage.

Figure 23:
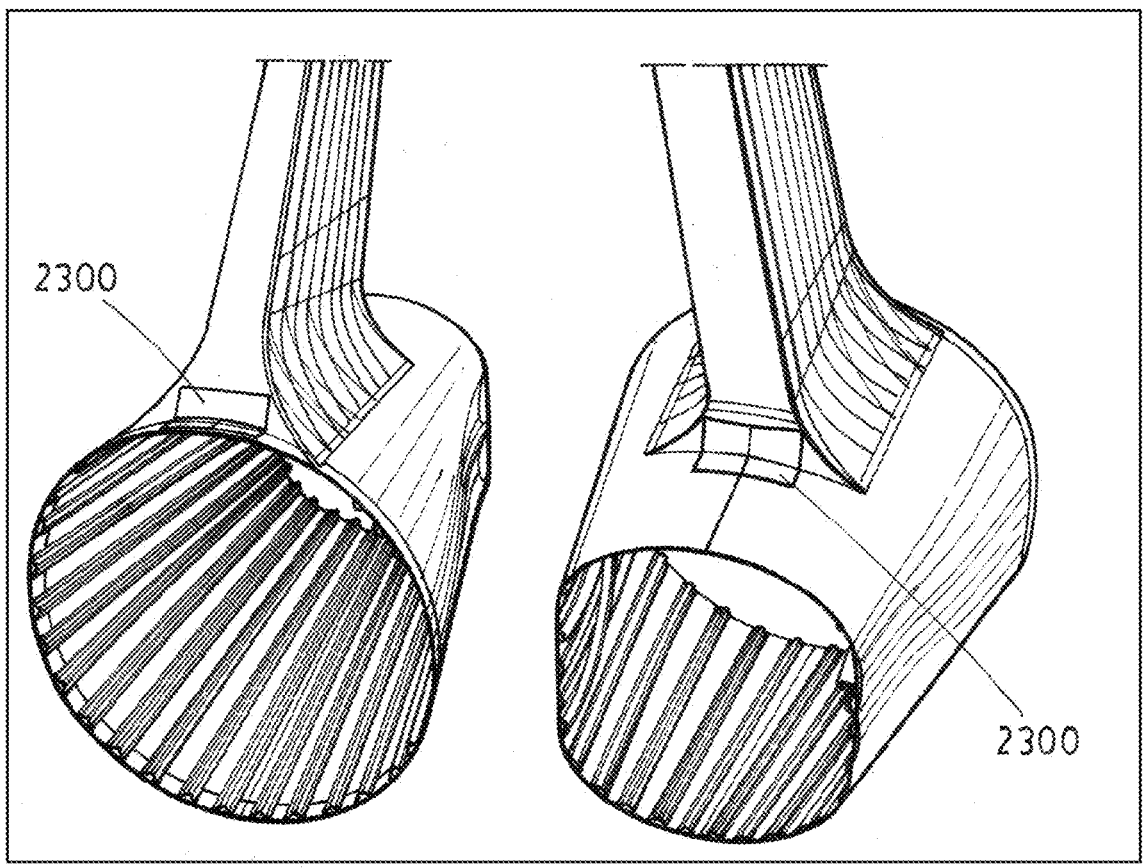

FIG. 23 shows isometric view and front view of the resulting structure after removing all the tools. As it can be seen is an integral structure with continuous skin that is manufactured in one shot. FIG. 23 shows the angular joint (2300) that is added on additional step to attach the front and rear spar to the fuselage skin by means of riveting, bounding or other by other junction mean.

On final step the internal frames of the fuselage and additional internal reinforcements of the fuselage and internal ribs and additional internal reinforcements of the empennage or even additional parts to join the fuselage and empennage interface structure are added and joined mechanically by means of riveting, bounding or other junction mean, to form the complete final structure of the rear end of the aircraft.

Figure 24:
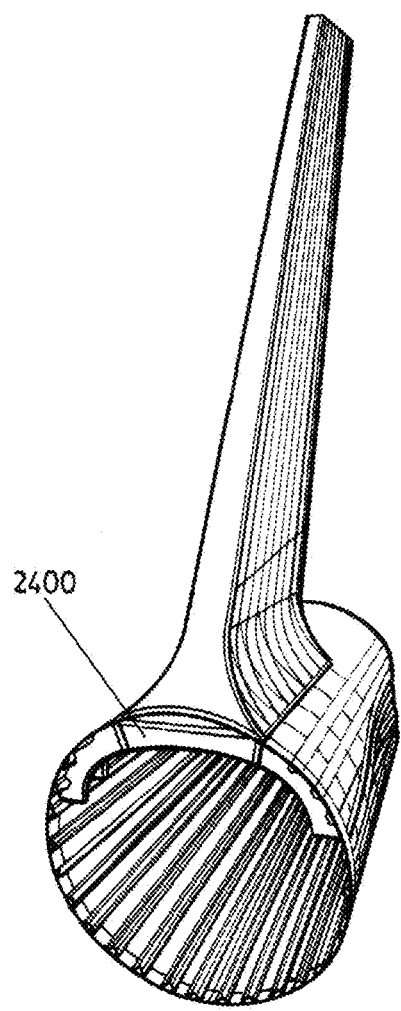
FIG. 24 shows the final composite structure with upper part of the frame.

FIG. 24 shows a view of the upper part of the fuselage frames joined to the fuselage skin and empennage spar webs in shear. As it can be seen on the figure, the frames (2400) and other reinforcement elements could be split in different subparts to easy their assembly process. The remaining lateral and lower sections of the frames (not showed on the figure) can be added afterwards and joined to the tail cone skin and the upper section by means of mechanical fixations as rivets. Even additional longitudinal stringers can be added and joined by mechanical fixation to the cone skin at this afterwards step.

Alternatively, in other examples the frame shear ties could be integrated on additional fuselage tooling cavities so that they could be cured directly with the skin. Main advantages is that this parts allow much flexibility on the installation tolerance of the frames, without the need that the frames contact directly the skin of the fuselage as contact is preformed though the shear ties.

Alternatively, in another example, the layup of the last frame could be added directly to the tooling with dedicated cavities to allocate the flanges of the frame, so that last frame, the skin and stringers of the fuselage of the aircraft and the skin and spars of the vertical tail plane are cured at the same time in one shot. The main advantage of this example is the reduction of cost and lead time due to the saving of the assembly of that last frame on an additional step.

Alternatively, the frames could be slanted following the plane of the vertical tail plane spars so that no upper transition piece is required on the frame. The web of the spars and frames could be joined directly with shear junction.

Figure 25:
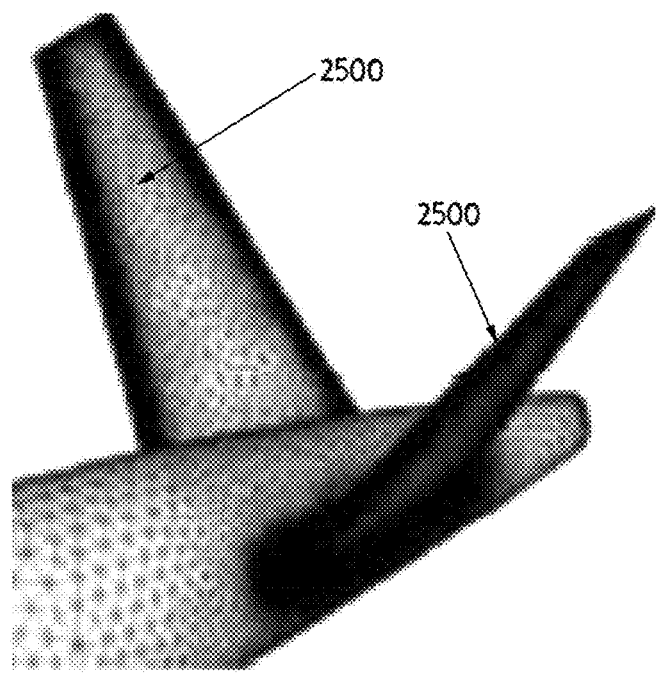
FIG. 25 shows rear section of an aircraft with vertical tail plane and horizontal tail planes obtain by performing the manufacturing process according to the present disclosure.

In the presented embodiment the vertical tail plane or more generically the empennage or even more generically the lifting surfaces are following either a vertical plane (VTP) or and Horizontal plane (HTP) but it is possible an additional embodiment in which the lifting surfaces follow an oblique angle instead of a vertical or horizontal one, forming for example a V-tail (2500) at the rear fuselage as shown in FIG. 25, with the advantage of reducing the number of lifting surfaces from three to two, reducing the number of interfaces with the fuselage and as consequence the complexity of the assembly and penalty weight. The present invention is applicable to any lifting surface that follows any angle with respect to the vertical symmetrical plane and the combination of more than one lifting surface with different angle. It can also be applicable to larger lifting surfaces than empennage as wings.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing a combined vertical tail plane and fuselage barrel assembly having a continuous skin, the method comprising:
    assembling a vertical tail plane tooling that includes an intermediate tooling, wherein the vertical tail plane tooling is configured to form intermediate preforms for a vertical tail plane;
    assembling a fuselage barrel tooling, wherein the fuselage barrel tooling includes a cut-out and longitudinal cavities;
    attaching the vertical tail plane tooling to the fuselage barrel tooling at the cut-out of the fuselage barrel tooling;
    performing a composite skin lay-up over the fuselage barrel tooling and the vertical tail plane tooling to form a continuous skin over outer surfaces of the vertical tail plane tooling and the fuselage barrel tooling;
    curing the composite skin lay-up while over the vertical tail plane tooling and the fuselage barrel tooling; and
    demoulding the vertical tail plane tooling and the fuselage barrel tooling from the cured composite skin lay-up to form the combined vertical tail plane and fuselage barrel assembly having the continuous skin.

2. The method according to claim 1, wherein the assembly of the vertical tail plane tooling further comprises:
    including in the vertical tail plane tooling a rear spar tooling configured to form a rear spar preform;
    including in the vertical tail plane tooling a front spar tooling configured to form a front spar preform; and
    attaching the rear spar tooling and the front spar tooling to the intermediate tooling.

3. The method according to claim 1, further comprising:
    laminating stringers on the longitudinal cavities of the fuselage barrel tooling before the curing of the composite skin lay-up; or
    fastening stringers to the fuselage barrel after the demoulding step of the fuselage barrel tooling.

4. The method according to claim 3, wherein the demoulding step includes:
    demoulding the vertical tail plane assembly before demoulding the fuselage barrel tooling, wherein the fuselage barrel tooling includes a metallic layer conforming to an internal surface of the fuselage and stringers.

5. The method according to claim 1, wherein the demoulding step includes:
    demoulding the vertical tail plane tooling before demoulding the fuselage barrel tooling, wherein the intermediate tooling comprises a root join part extension, and
    the intermediate tooling is demoulded through a second cut-out of the fuselage barrel tooling.

6. The method according to claim 1, wherein the demoulding step includes:
    demoulding the fuselage barrel tooling before the intermediate tooling, wherein the fuselage barrel tooling includes an additional rear part.

7. The method according to claim 1, wherein the demoulding step includes:
    demoulding the fuselage barrel tooling before the intermediate tooling, wherein the fuselage barrel tooling includes a concave outer face configured to conform to an inside surface of the fuselage.

8. The method according to claim 1, wherein the step of performing the composite skin lay up includes performing a skin lay-up of the vertical tail plane tooling, performing a skin lay-up of the fuselage barrel tooling and thereafter performing a final composite skin lay-up over the vertical tail plane tooling and the fuselage barrel tooling.

9. The method according to claim 1, wherein the intermediate preforms comprise middle spars, torsion box panels and intermediate flange stiffeners.

10. The method according to claim 1, wherein the assembly of the vertical tail plane tooling further comprises joining one or more of:
    internal frames of the fuselage barrel tooling with additional internal reinforcements of the fuselage barrel tooling;
    internal ribs of the vertical tail plane tooling with additional internal reinforcements of the vertical tail plane tooling; and
    additional parts configured to join the fuselage barrel tooling with a vertical tail plane interface structure of the vertical tail plane tooling.

11. The method according to claim 1, further comprising assembling a lifting surface tooling and thereafter attaching the lifting surface tooling to the fuselage barrel tooling.

12. A method comprising:
    assembling a vertical tail plane tooling configured to form intermediate preforms for a vertical tail plane;
    assembling a fuselage barrel tooling including a cut-out and longitudinal cavities;
    attaching the vertical tail plane tooling to the fuselage barrel tooling at the cut-out of the fuselage barrel tooling;
    after the attaching step, laying up a composite skin over the fuselage barrel tooling and the vertical tail plane tooling to form a continuous skin covering outer surfaces of the vertical tail plane tooling and the fuselage barrel tooling;
    curing the composite skin while over the outer surfaces of the vertical tail plane tooling and the fuselage barrel tooling;
    removing the vertical tail plane tooling and the fuselage barrel tooling from the cured composite skin, and
    wherein the cured composite skin forms at least a portion of both a vertical tail plane and fuselage barrel.

13. The method according to claim 12, wherein the step of assembling the vertical tail plane tooling further comprises assembling a rear spar tooling configured to form a rear spar preform, a front spar tooling configured to form a front spar preform, and an intermediate tooling to connect the front spar and rear spar tooling.

14. The method according to claim 12, further comprising laminating stringers within the longitudinal cavities of the fuselage barrel tooling to the composite skin before the curing of the composite skin.

15. The method according to claim 14, wherein the demoulding step includes:
   demoulding the vertical tail plane assembly before demoulding the fuselage barrel tooling, wherein the fuselage barrel tooling includes a metallic layer conforming to an internal surface of the fuselage and stringers.

16. The method according to claim 12, wherein the vertical tail plane tooling includes an intermediate tooling and the step of demoulding includes:
   demoulding the vertical tail plane tooling before demoulding the fuselage barrel tooling, and
   the intermediate tooling is demoulded through a second cut-out in the fuselage barrel tooling.

17. The method according to claim 12, wherein the step of laying up the composite skin includes laying up a first section of the composite skin on the vertical tail plane tooling, laying up a section of the composite skin on the fuselage barrel tooling and thereafter laying up a third section of the composite skin over both the first and second sections.

\* \* \* \* \*